United States Patent
Ewing et al.

(10) Patent No.: US 10,049,552 B1
(45) Date of Patent: *Aug. 14, 2018

(54) ASSET TRACKING SYSTEMS AND METHODS

(71) Applicant: Synapse Wireless, Inc., Huntsville, AL (US)

(72) Inventors: David Ewing, Madison, AL (US); Mark Guagenti, Huntsville, AL (US); Wade C. Patterson, Huntsville, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/465,365

(22) Filed: Mar. 21, 2017

Related U.S. Application Data

(63) Continuation of application No. 14/267,683, filed on May 1, 2014, now Pat. No. 9,619,989.

(60) Provisional application No. 61/835,935, filed on Jun. 17, 2013.

(51) Int. Cl.
*G08B 21/18* (2006.01)
*H04L 12/931* (2013.01)

(52) U.S. Cl.
CPC ............ *G08B 21/18* (2013.01); *H04L 49/201* (2013.01)

(58) Field of Classification Search
CPC ..... A61B 5/1113; A61B 5/1112; G08B 13/00; G08B 13/1427; G08B 13/2462; G08B 21/00; G08B 21/02; G08B 21/0202; G08B 21/0247; G08B 21/0272; G08B 21/04; G08B 21/18; G08B 25/00; G08B 25/009; G08B 26/00; G08B 27/00; G08B 27/005; G08C 2201/00; G08C 2201/40; G08C 2201/42; G08C 2201/50; G08C 2201/91; H04B 1/005; H04B 1/59; H04B 7/14; H04H 20/00; H04L 45/16; H04L 49/201; H04W 4/02
USPC ........................ 340/539.1–539.32, 10.1–10.6
See application file for complete search history.

(56) References Cited

U.S. PATENT DOCUMENTS

| | | | | |
|---|---|---|---|---|
| 5,809,016 A | * | 9/1998 | Kreitzer | H04W 88/023 340/7.44 |
| 2009/0092073 A1 | * | 4/2009 | Doppler | H04B 7/022 370/315 |
| 2009/0131012 A1 | * | 5/2009 | Ashley, Jr. | G01S 5/0018 455/404.2 |

* cited by examiner

*Primary Examiner* — Brian Wilson
(74) *Attorney, Agent, or Firm* — Maynard Cooper & Gale, P.C.; Jon Holland

(57) ABSTRACT

An asset tracking system has a plurality of anchors. A tag communicates with the anchors as it is moved by a user being tracked by the system, and data based on communication between the tag and at least one of the anchors is transmitted to a server. The server determines a location of the tag based on the data and detects an occurrence of an event based on the location. The server also transmits to each of the anchors a tag alert message having a tag identifier identifying the tag and an event indicator associated with the occurrence of the event. At least one of the anchors transmits the tag identifier and the event indicator to the tag, which issues a warning to the user in response to tag alert message.

17 Claims, 11 Drawing Sheets

| Room | Patient Name | Visit Needed |
|---|---|---|
| 301 | John Smith | X |
| 302 | Jill Duncan | |
| 303 | Jane Doe | X |
| 304 | Bill Johnson | X |

| Room | Patient Name | Visit Needed |
|---|---|---|
| 301 | John Smith | |
| 302 | Jill Duncan | |
| 303 | Jane Doe | X |
| 304 | Bill Johnson | X |

| Room | Patient Name | Visit Needed |
|---|---|---|
| 301 | John Smith | |
| 302 | Jill Duncan | |
| 303 | Jane Doe | |
| 304 | Bill Johnson | X |

ASSET TRACKING SYSTEMS AND METHODS

CROSS REFERENCE TO RELATED APPLICATION

This application is a continuation of and claims priority to U.S. patent application Ser. No. 14/267,683, entitled "Asset Tracking Systems and Methods" and filed on May 1, 2014, which is incorporated herein by reference. U.S. patent application Ser. No. 14/267,683 claims priority to U.S. Provisional Patent Application No. 61/835,935, entitled "Systems and Methods for Monitoring Compliance with Hand Washing Policies" and filed on Jun. 17, 2013, which is incorporated herein by reference.

RELATED ART

Healthcare policies often require caregivers, such as nurses or doctors, to wash their hands after entering a room and before touching a patient in the room in an effort to prevent or reduce the occurrences of infections that could complicate a patient's condition. Unfortunately, however, caregivers often do not comply with such policies. In an effort to alleviate or monitor this problem, systems for monitoring caregiver compliance with hand washing policies have been developed. Such monitoring systems usually track caregivers and attempt to determine when a caregiver fails to wash his or her hands after entering the patient's room. Upon detection of such event, a notification is communicated to the caregiver or other user.

As an example, the caregiver may be warned that he or she is approaching a patient without complying with an applicable hand washing policy thereby reminding the caregiver to wash his or her hands before touching the patient. Also, an administrator may be notified of the event to assist the administrator in determining to what extent applicable hand washing policies are being followed so that the administrator can make better management decisions.

Such monitoring systems are usually complicated and expensive and are often plagued with reliability or performance issues. In particular, sensing the locations of caregivers can be problematic in healthcare environments, such as large hospitals. Further, even when the location of a particular caregiver can be determined, techniques must be developed for accurately determining when he or she has washed his or her hands. In a large hospital, there can be hundreds or even thousands of caregivers further complicating the decisions made by the monitoring system and also creating a large amount of data that must be processed by the system. Techniques for reducing the complexities and costs of such monitoring systems are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 12 depicts the rounding list of FIG. 11 after the list has been further updated.

FIG. 13 depicts the rounding list of FIG. 12 after the list has been initialized for a new monitoring period.

DETAILED DESCRIPTION

The present disclosure generally pertains to asset tracking systems and methods. In one exemplary embodiment, an asset tracking system is used for monitoring compliance with hand washing policies. In such system, nodes of a wireless network are dispersed throughout a healthcare facility and track caregivers as they move through the facility. Based on such tracking, the system determines when caregivers enter rooms of the facility and whether they wash their hands after entering a patient's room or are otherwise approaching a patient. The system detects a hand washing violation event if it determines that a caregiver has yet to wash his or her hands within a certain time period after entering a patient's room or is approaching a patient without washing his or hands after entering the patient's room. Upon detection of such event, the system logs the event and also transmits a notification to the caregiver in order to remind the caregiver to wash his or her hands before touching the patient.

Figure 1:
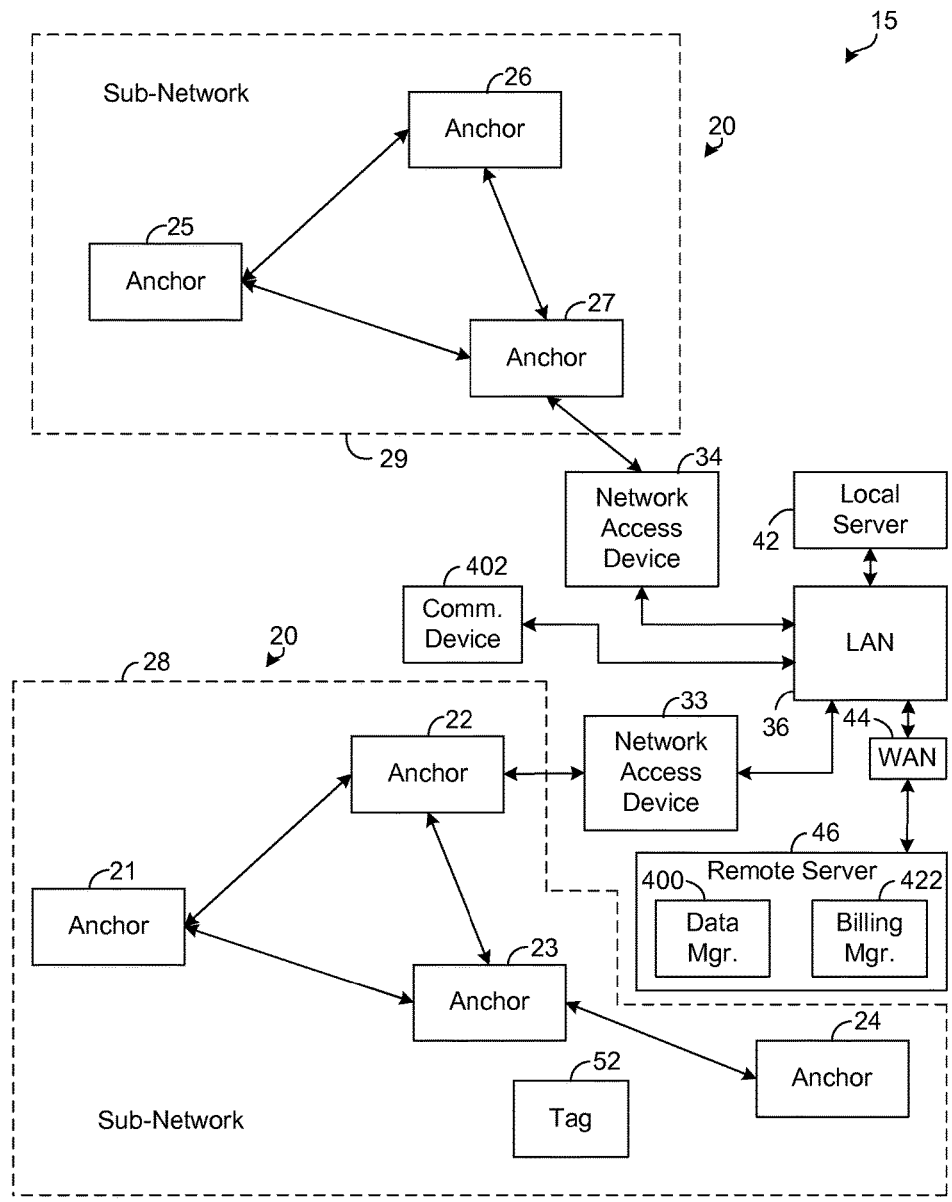
FIG. 1 is a block diagram illustrating an exemplary embodiment of a system for monitoring compliance with hand washing policies.

FIG. 1 depicts an exemplary embodiment of a system 15 for monitoring compliance with a hand washing policy at a healthcare facility, such as a hospital, retirement home, or other location. As shown by FIG. 1, the system 15 comprises a wireless sensor network (WSN) 20 having a plurality of nodes 21-27. In one exemplary embodiment, the nodes 21-27 are stationary and shall be referred to hereafter as "anchors," but any of the nodes 21-27 may be mobile in other embodiments. FIG. 1 depicts seven anchors 21-27 for simplicity, but the network 20 may have any number of anchors 21-27 in other embodiments. In one exemplary embodiment, the network 20 is implemented as a mesh network, but other types of networks may be implemented in other embodiments. Exemplary networks are described in commonly-assigned U.S. patent application Ser. No. 12/114, 566, entitled "Systems and Methods for Dynamically Configuring Node Behavior in a Sensor Network, and filed on May 2, 2008, which is incorporated herein by reference.

Each anchor 21-27 is able to communicate with any of the other anchors 21-27. In one exemplary embodiment, the anchors 21-27 communicate among one another wirelessly, but it is possible for any of the anchors 21-27 to communicate with any of the other anchors 21-27 over a conductive medium or otherwise. Messages may hop from anchor-to-anchor in order to reach a destination. For example, in the exemplary embodiment shown by FIG. 1, the anchors 21-23 are within range of each other such that any of the anchors 21-23 can communicate directly with any of the other anchors 21-23. However, the anchor 24 is only within range of anchor 23. The other anchors 21 and 22 can use the anchor 23 to route or otherwise transmit a message to the anchor 24. In one exemplary embodiment, each anchor 21-27 has a routing table that indicates designated routes for messages. As known in the art, routing tables can be created and updated via a variety of techniques. In general, anchors communicate among one another to learn of data paths for various destinations. Once a path to a particular destination is discovered, the routing table or tables of the anchors along the path may be updated and later used to route a message to the destination.

As known in the art, a unicast message is a message that is routed to a particular node (e.g., anchor) identified by the message. In this regard, each unicast message includes a source address indicating the network address of the node from which the message originated and a destination address indicating the network address of the node that is to receive the message. The unicast message also includes a next-hop address identifying the next node that is to receive the message as it is progressing toward the destination node. The nodes communicate with one another to learn routes through the network 20, and the nodes' routing tables are updated to indicate the learned routes. Based on these routing tables, a unicast message hops through the network, node-by-node, until the message reaches its identified destination. When a node receives a unicast message, the node will process the unicast message only if it is identified by the message's next-hop address or destination address. Before retransmitting the message, the node uses its routing table to determine the next hop for the message and updates the next-hop address in the message so that it identifies the next node that is to receive the message.

Multicast messages, on the other hand, are not forwarded based on routing tables but are instead rebroadcast by nodes that receive it. In this regard, each multicast message includes a source address indicating the network address of the node from which the message originated. Rather than having a destination address identifying a single destination node, a multicast message often has a group identifier identifying a group of nodes that are to receive and process the message. One type of message, referred to as a "broadcast" message, is to be processed by all of the nodes that receive it. Generally, each node that receives the multicast message retransmits the multicast message so that it can be heard by the other nodes within range of the transmitting node. Thus, the multicast message should eventually reach each node within the identified multicast group. The multicast message has a time-to-live value that is decremented each time it is retransmitted, and the nodes stop retransmitting the multicast message once this value falls below a threshold. Such practice eventually stops propagation of the multicast message so that it is not retransmitted in perpetuity. If desired, parameters (e.g., time-to-live value and multicast group identifier) in the header of a multicast message can be set such that the multicast message reaches each node of the network 20 or any group of nodes within the network 20, such as at least the anchors of a particular sub-network. If desired, a multicast message may have a destination address or group identifier identifying a single node. In such case, the message is rebroadcast through the network 20, and the node identified as the message's destination or group further processes the message as may be desired, whereas the other nodes that receive the message only retransmit the message.

In one exemplary embodiment, the nodes of the system 15 are designed to communicate only multicast messages. That is, unicast messages are not used, and there is no need for the nodes to build routing tables. Such an embodiment can significantly reduce congestion and data collisions since it is unnecessary for the nodes to communicate additional messages for discovering routes through the network. For illustrative purposes, it will be assumed hereafter that the nodes of the network 20 communicate only multicast message unless otherwise indicated herein.

As illustrated by FIG. 1, the anchors 21-27 may be arranged in groups, referred to herein as "sub-networks." FIG. 1 shows two sub-networks 28 and 29, but any number of sub-networks is possible. In particular, sub-network 28 includes anchors 21-24, and sub-network 29 includes anchors 25-27. Each sub-network 28 and 29 has a respective network access device 33 or 34 through which the anchors of the sub-network communicate in order to access a network, such as a local area network (LAN) or wide area network (WAN). In the embodiment shown by FIG. 1, each network access device 33 and 34 is communicatively coupled to a LAN 36 and interfaces messages between the protocol of the WSN 20 and the protocol of the LAN 36. As an example, in one embodiment, the LAN 36 employs Ethernet protocols, and each network access device 33 and 34 encapsulates messages received from its respective sub-network in accordance with an applicable Ethernet protocol for communication through the LAN 36. If desired, a network access device 33 or 34 may de-encapsulate the messages received from the WSN 20 or alternatively encapsulate both payload and overhead (e.g., a header) of the received messages for transmission through the LAN 36. In the opposite direction, each network access device 33 and 34 de-encapsulates messages from the LAN 36 to recover packets in accordance with the protocol of the WSN 20. If the recovered data is already compatible with the protocol of the WSN 20, a network access device 33 or 34 may simply transmit the recovered data to an anchor of its respective sub-network. Otherwise, the network access device 33 or 34 may encapsulate the recovered data in accordance with the protocol of the WSN 20.

Note that anchors 21-27 of the different sub-networks 28 and 29 are members of the same WSN 20, and an anchor of one sub-network may reach an anchor of another sub-network. However, one sub-network may be located in a geographic region outside of the range of anchors in another sub-network such that direct communication between the two sub-networks is not possible. In such case, messages may pass through the LAN 36 or other type of network. As an example, the anchor 22 may transmit a message through the network access device 33, LAN 36, and network access device 34 to the anchor 27. In one exemplary embodiment, the LAN 36 is coupled to a local server 42 that is configured to manage traffic between sub-networks. In this regard, the local server 42 is assigned an address of the WSN 20 and functions as one of the nodes of the WSN 20 such that unicast messages (if used) may be routed through the local server 42 and multicast messages may pass through the server 42. For example, when the local server 42 receives a multicast message from a network access device 33 or 34, the local server 42 may transmit such multicast message through the LAN 36 to each remaining network access device of which the local server 42 is aware.

Thus, the local server 42 may be the next hop for a message from either of the network access devices 33 or 34. In one embodiment, the local server 42 is provisioned to know the network configuration, including the network address of the anchors and other nodes of the WSN 20. In other embodiments, the server 42 may be configured to dynamically learn the network configuration. As an example, each anchor 21-27 may be configured to join the network 20 and to transmit a message announcing its presence, referred to hereafter as an "anchor discovery message." Such message may be a multicast message that is communicated through WSN 20, including the local server 42. In this regard, the local server 42 may discover the presence of an anchor and/or its associations with its respective network access device 33 or 34 based on the anchor discovery message transmitted by the anchor upon joining the network 20. For example, based on the anchor discovery message originating from the anchor 24, the local server 42 can learn the anchor's network address and determine that it is associated with the network access device 33 since the local server 42 receives the anchor discovery message from this network access device 33. Thus, later, if the local server 42 is to transmit a message to the anchor 24, the local server 42 is aware that the message can reach the anchor 24 through the network access device 33.

When the source node of a unicast message is in one sub-network and the destination node is in another sub-network, the message may be communicated to the local server 42, which then forwards the message to the appropriate network access device 33 or 34 for communication to the destination node. As an example, when the anchor 24 is transmitting a message to the anchor 27, the message may be received by the local server 42, which based on the message's destination address forwards the message to the network access device 34 through the LAN 36. In other embodiments, other techniques for communicating messages among anchors or nodes within a wireless sensor network are possible. Alternatively, the anchor 24 may transmit a multicast message to the anchor 27 by specifying a time-to-live value that is sufficiently large such that the message eventually reaches the anchor 27 as it is retransmitted by the nodes that receive it.

Each anchor 21-27 may be positioned at a specific location within a facility, such as a patient room at a hospital. In one embodiment, each anchor 21-27 is mounted on a wall within a room or hall of a healthcare facility, although it is possible for any anchor 21-27 to be mounted or otherwise positioned at a different location.

In one exemplary embodiment, the LAN 36 is coupled to a WAN 44, such as the Internet or other known communication network. The WAN 44 is coupled to a remote server 46. As will be described in more detail hereafter, messages are communicated between the local server 42 and the remote server 46 via the LAN 36 and the WAN 44. In one exemplary embodiment, transmission control protocol/Internet protocol (TCP/IP) is used for such communication, but other protocols and network types are possible in other embodiments. The local server 42 is located relatively close to the WSN 20 (e.g., at the same healthcare facility) such that communication between the local server 42 and the anchors 21-27 via a WAN is unnecessary. Such a feature helps to reduce communication latency thereby reducing the time that the local server 42 responds to data from the anchors 21-27. In addition, the local server 42 is able to maintain communication with the anchors 21-27 regardless of any communication problem or connectivity issues associated with the WAN 44. However, in other embodiments, it is possible for the components of the server 42 to be located remotely from the anchors 21-27 and communicate with the anchors 21-27 via WAN 44 or otherwise.

As shown by FIG. 1, the system 15 comprises at least one mobile node 52, referred to herein as a "tag," that is configured to wirelessly communicate with the anchors 21-27 as the tag 52 is moved through the healthcare facility or other location at which the anchors 21-27 are situated. In one exemplary embodiment, the tag 52 is attached to an asset (e.g., a person or object) to be monitored in order to track movements of the asset, as will be described in more detail hereafter. In one exemplary embodiment, the tag 52 is a node of the WSN 20, but it is not configured to route messages through the WSN 20. That is, the tag 52 may transmit a network message to an anchor 21-27 for communication of the message through the WSN 20. Also, messages identifying the tag 52 are communicated through the WSN 20 such that they are received by the tag 52. However, the tag 52 does not serve as an intermediate hop for messages, including multicast messages, that do not identify it. Preventing the tag 52 from performing routing functions helps to conserve the tag's power. In this regard, not only are the tag's functions reduced, but the tag may sleep from time-to-time while the anchors 21-27 remain operational for routing functions.

As an example, from time-to-time, the tag 52 may be configured to transition to a sleep state in which components of the tag 52 are deactivated so that the tag 52 consumes less power. In particular, the tag's communication components may be deactivated such that the tag 52 is unable to communicate with external devices while in a sleep state. If desired, the tag 52 may be configured to periodically awaken from its sleep state, briefly communicate with at least one anchor 21-27 so that its location can be discovered and information can be exchanged for a brief period of time, and then transition back to a sleep state. Thus, the tag 52 can be configured to spend a significant amount of time in a sleep state such that the useful life of the tag's batteries is significantly extended.

Figure 2:
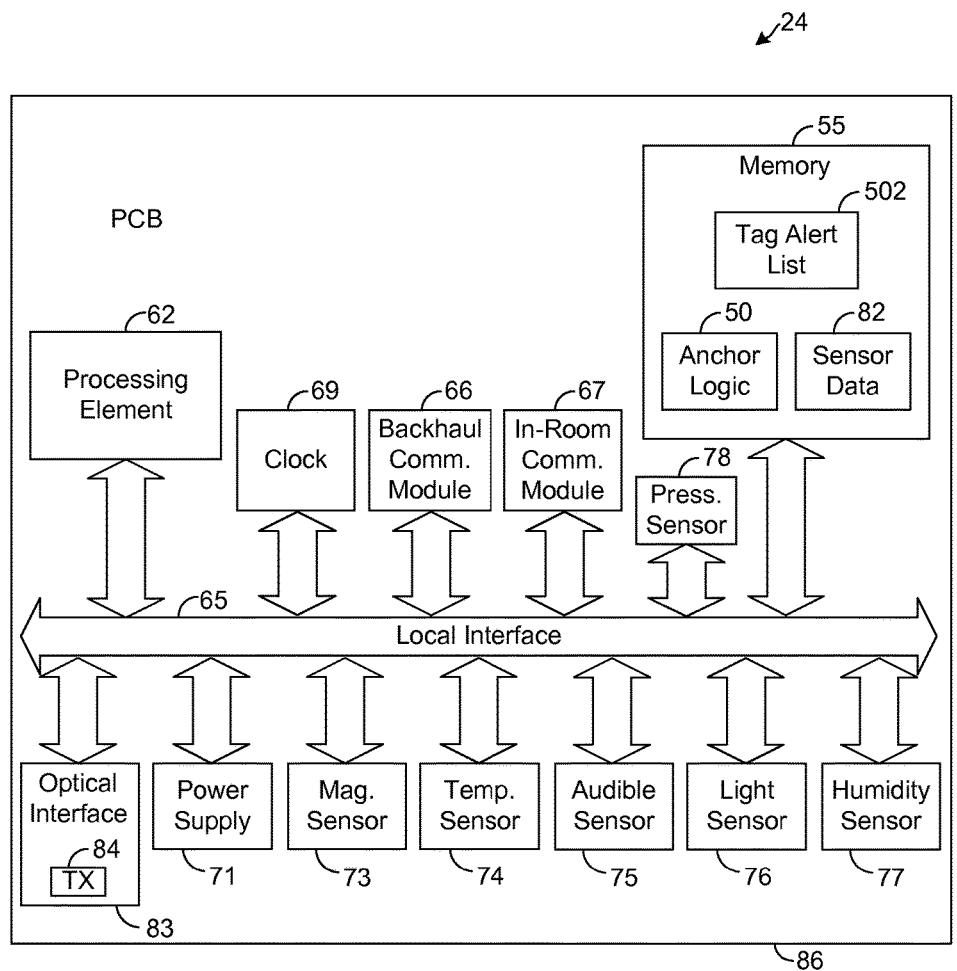
FIG. 2 is a block diagram illustrating an exemplary embodiment of a network node, such as is depicted by FIG. 1.

FIG. 2 depicts an exemplary embodiment of one of the anchors 24. Note that any of the other anchors 21-23 and 25-27 may be configured similarly to or identical to the anchor 24 depicted by FIG. 2. The exemplary anchor 24 shown by FIG. 2 comprises logic 50, referred to herein as "anchor logic," which may be implemented in software, firmware, hardware, or any combination thereof. In FIG. 2, the anchor logic 50 is implemented in software and stored in memory 55. However, other configurations of the logic 50 are possible in other embodiments.

Note that the anchor logic 50, when implemented in software, can be stored and transported on any computer-readable medium for use by or in connection with an instruction execution apparatus that can fetch and execute instructions. In the context of this document, a "computer-readable medium" can be any means that can contain or store code for use by or in connection with the instruction execution apparatus.

The exemplary embodiment of the anchor 24 depicted by FIG. 2 includes at least one conventional processing element 62, which comprises processing hardware for executing instructions stored in the memory 55. As an example, the processing element 62 may comprise a central processing unit (CPU) or a digital signal processor (DSP). The processing element 62 communicates to and drives the other elements within the anchor 24 via a local interface 65, which can include at least one bus. The anchor 24 has a clock 69, which can be used to track time.

The anchor 24 also has a pair of communication modules 66 and 67. Each of the modules 66 and 67 comprises a radio frequency (RF) radio or other device for communicating wirelessly. One of the modules 66, referred to herein as "backhaul communication module," is used for communicating with the other anchors 21-27, which form a backhaul channel for communicating messages with the local server 42. As an example, the backhaul communication module 66 is used for communicating messages between the anchor 24 and the local server 42 (FIG. 1). The backhaul communication module 66 is also used for communicating network messages that hop through the anchor 24. The communication module 67, referred to hereafter as "in-room communication module," is used for communicating with devices in or near the same room as the anchor 24, including devices that move about the healthcare facility, such as the tags 52.

In one exemplary embodiment, the backhaul communication module 66 is dedicated for backhaul communication among the anchors 21-27 and server 42. Such backhaul communication includes the communication of messages hopping from one anchor 21-27 to the next. Also, the frequency of the backhaul channel is different than the frequency of the channel, referred to hereafter as "in-room channel," used by the in-room communication module 67 for communication with other devices, such as the tags 52. Having separate channels for the backhaul communication and the tag communication helps to reduce data collisions and congestion problems that otherwise would occur if the modules 66 and 67 share the same channel for communication. In other embodiments, use of separate channels for the backhaul communication and the in-room communication is unnecessary.

The anchor 24 has a power supply 71, which provides electrical power to the components of the anchor 24. In one exemplary embodiment, the power supply 71 has an interface that allows it to plug into or otherwise interface with an external component, such as a wall outlet or battery, and receive electrical power from such external component. If desired, the power supply 71 may comprise one or more batteries so that interfacing with an external power component is unnecessary.

As shown by FIG. 2, the anchor 24 comprises a plurality of sensors 73-78. Specifically, the anchor 24 has a magnetic sensor 73, a temperature sensor 74, a light sensor 76, a humidity sensor 77, and a pressure sensor 78. The magnetic sensor 73 (e.g., a compass) is configured to sense a magnetic field and determine an orientation of the anchor 24. As an example, the magnetic sensor 73 may be configured to provide a value indicative of a direction (e.g., angle) of the sensor 73 and, hence, anchor 24 relative to magnetic North. The temperature sensor 74 is configured measure ambient temperature of the room in which the anchor 24 is located. The light sensor 76 is configured to sense ambient light in the room in which the anchor 24 is located. Further, the humidity sensor 77 is configured to sense the humidity in the room in which the anchor 24 is located, and the pressure sensor 78 is configured to sense atmospheric pressure at the anchor 24. Data indicative of the samples taken by the sensors 73-78 is stored in memory 55 as sensor data 82.

From time-to-time, the anchor logic 50 is configured to transmit the sensor data 82 to the local server 42 via the backhaul channel. Exemplary configurations of the anchor logic 50 and techniques for network communication are described in commonly-assigned U.S. Pat. No. 8,204,971, entitled "Systems and Methods for Dynamically Configuring Node Behavior in a Sensor Network" and filed on May 24, 2011, which is incorporated herein by reference. The sensor data 82 may be analyzed to determine the conditions in the room over time. In this regard, each sample is timestamped based on the time indicated by the clock 69 in order to indicate when the sample is taken. The sensor data 82 may be presented to a user, such as a hospital administrator, for analysis or otherwise analyzed to determine whether the conditions within the room remain within a desired range, as will be described in more detail hereafter.

In one exemplary embodiment, each component shown by FIG. 2 resides on and is integrated with a printed circuit board (PCB) 86. However, in other embodiments, other arrangements of the anchor 24 are possible.

As shown by FIG. 2, the anchor 24 also has an optical interface 83 that is configured to communicate optical signals. In one exemplary embodiment, the interface 83 comprises an optical transmitter 84 that is configured to transmit infrared signals. In other embodiments, the interface 83 may be configured for both transmission and reception of optical signals of any desired wavelength. For illustrative purposes, it will be assumed hereafter that the transmitter 84 is configured to transmit infrared signals, but it should be noted that other types of signals may be transmitted or received by the interface 83 in other embodiments.

The optical transmitter 84 is configured to repetitively (e.g., periodically) transmit an infrared signal defining an identifier, referred to herein as "room identifier," unique to the room in which the anchor 24 is located. As known in the art, infrared signals are limited by line of sight. Indeed, if a tag 52 is in another room, the infrared energy transmitted by the anchor 24 should be blocked by walls or other objects thereby preventing the tag 52 from receiving such energy. Thus, if the anchor 24 is situated in a room of a building, then it is likely that the tag 52 is in the same room or is at least close to (e.g., in the adjacent room or hallway) this same room when it is receiving the room's identifier from such anchor 24. Other techniques for identifying the room in which at tag 52 is located are possible in other embodiments.

In one exemplary embodiment, anchors 21-27 are situated in different rooms of a building, such as a healthcare facility, and each anchor 21-27 optically transmits a room identifier of the room in which it is situated. Thus, the optical signal transmitted by the optical transmitter 84 conveys location information to the tag 52, and this location information can be used to help determine the tag's current proximity, as will be described in more detail below.

In one exemplary embodiment, when a tag 52 receives a room identifier from the optical transmitter 84, the tag 52 transmits a message (referred to hereafter as a "tag status message") indicative of such room identifier via the in-room channel to at least one anchor, which could be the same anchor or a different anchor from which the room identifier was optically received. Such receiving anchor forwards the message via the backhaul channel to the local server 42, which may determine the tag's current location (e.g., in which room the tag 52 is located) based on the message. Note that such tag status message may include both the room identifier and an identifier (e.g., network address) of the tag 52. For example, the message may include the room identifier as payload, and the overhead of the message may have a source address identifying the tag 52. Based on such identifiers, the server 42 determines that the identified tag 52 is in the identified room. Therefore, based on the room identifier optically transmitted from the optical transmitter 84 of the anchor 24 to the tag 52, the server 42 determines the approximate location of the tag 52 and can then make control decisions based on such location, as will described in more detail below. In other embodiments, other types of information may be optically communicated between the anchor 24 and the tag 52 as may be desired.

Note that any anchor that receives the tag status message can transmit such message via the backhaul channel to the server 42. However, in an effort to reduce network traffic, the system 15 is configured such that only one anchor responds to the tag status message. In this regard, for each room there is a single anchor configured to handle backhaul communications with the server 42. Such anchor is configured to communicate with other nodes in the same room, such as other anchors or tags, and to serve as a proxy for communicating with the server 42 on behalf of such other nodes. When the foregoing anchor receives a tag status message, it responds to the message only if the room identifier in the message identifies the same room in which the anchor is located. Thus, for any given tag status message, there should only be one anchor that responds by transmitting the message to the server 42. In this regard, if another anchor in another room receives the same message, such other anchor should ignore the message since it does not identify that anchor's room. Accordingly, the overall traffic communicated across the network 20 is reduced. In other embodiments, other network configurations are possible, and multiple anchors may be configured to respond to a given tag status message, if desired.

Figure 3:
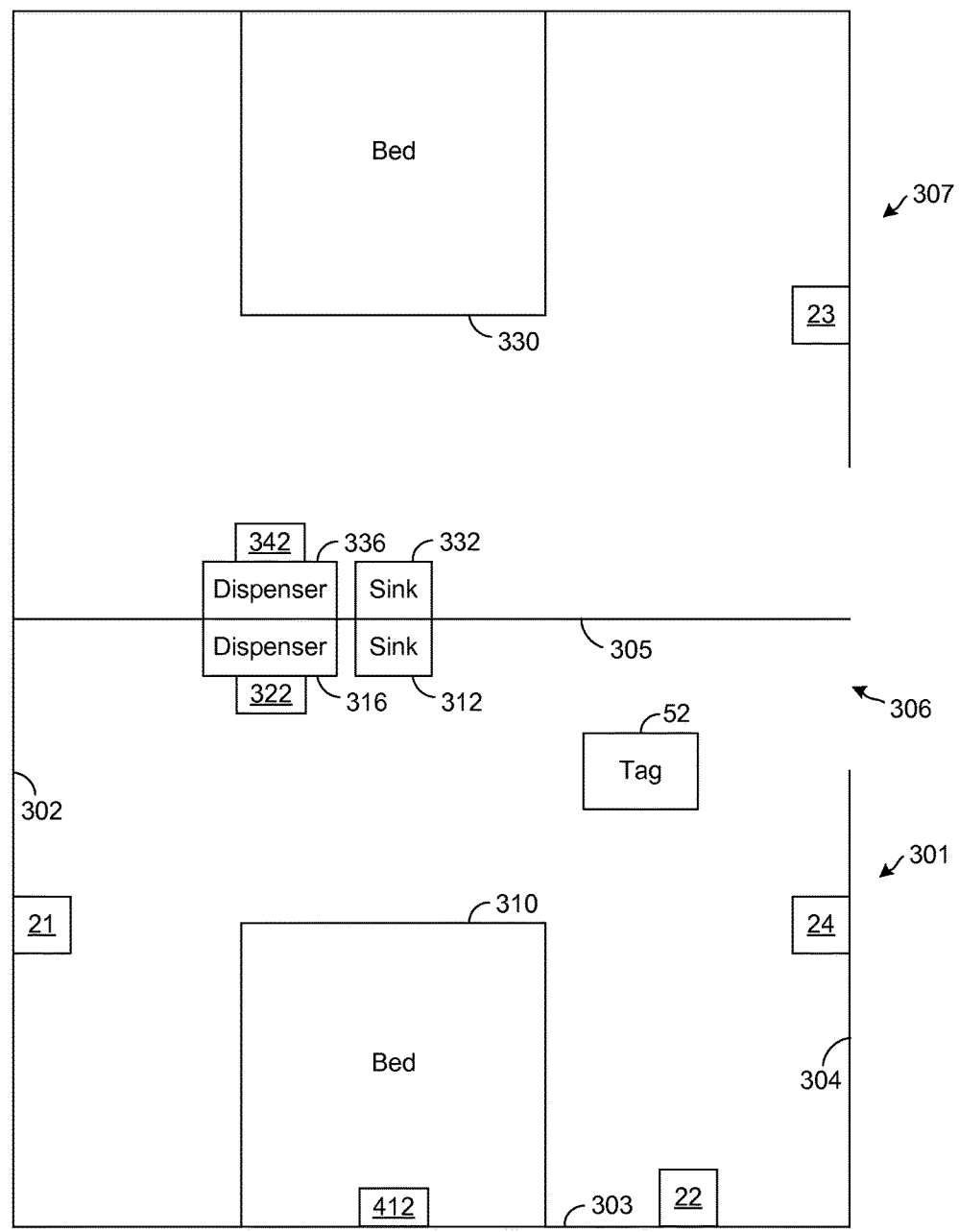
FIG. 3 depicts exemplary rooms in a healthcare facility for which a monitoring system, such as is depicted by FIG. 1, is used.

To increase the likelihood that the tag 125 receives light from at least one anchor when entering a room or other area, it may be desirable to situate more than one anchor in the room or other area. For example, FIG. 3 shows a room 301 having four walls 302-305 with a doorway 306 between walls 304 and 305. In the example shown by FIG. 3, anchors 21, 22, and 24 are mounted on the walls 302-304, respectively. Thus, with multiple anchors 21, 22, and 24 at different directions relative to the tag 52, there is a higher probability that, at any given instant, the tag 52 is likely facing at least one anchor 21, 22, and 24 within the room 301. Further, if an object blocks the line of sight from the tag 52 to any one anchor 21, 22, or 24, it is possible that a line of sight exists with another anchor within the same room 301. Thus, having multiple anchors 21, 22, and 24 in the same room 301 helps to ensure that the tag 52 is able to optically communicate with at least one anchor 21, 22, or 24 and, thus, receive an identifier of the room or other information optically transmitted by the anchors.

However, if the anchors 21, 22, and 24 are optically transmitting at the same wavelength, then it is possible for interference to occur. In this regard, if the tag 52 simultaneously receives optical signals from multiple anchors 21, 22, and 24, then the tag 52 may be unable to successfully read the signals. In an effort to avoid interference, the optical channel is time-division multiplexed in the downstream direction (i.e., from the anchors 21, 22, and 24 to the tag 52) in order to prevent interference among the anchors 21, 22, and 24. In this regard, according to a time-division multiplexing (TDM) algorithm, only one anchor 21, 22, and 24 in the same room 301 is permitted to transmit via the optical channel at a time such that optical transmissions within line of sight of the tag 52 are prevented from interfering with each other. For example, in one exemplary embodiment, the optical channel is segmented into frames, and each anchor 21, 22, and 24 in the room 301 is assigned one or more time slots in a frame such that, for a given time slot, only one anchor is permitted to transmit via the optical channel.

In addition, the optical transmitters of the anchors 21, 22, and 24 in the same room 301 are preferably synchronized so that proper timing relationships are maintained in order to keep the optical signals separated according to the TDM algorithm being employed. In one exemplary embodiment, the infrastructure of the backhaul network is leveraged to provide such synchronization at relatively small additional cost and complexity. In this regard, each network access device 33 and 34 is configured to periodically transmit a synchronization signal to the anchors in its respective sub-network, and such synchronization signal arrives at such anchors at substantially the same time. Reception of the synchronization signal marks the beginning (or some other point) of a frame so that the timing of the frame is consistent from anchor-to-anchor. In one exemplary embodiment, the synchronization signal is a multicast message, referred to hereafter as "downstream multicast message," that propagates through the sub-network. Exemplary synchronization techniques are described in commonly-assigned U.S. patent application Ser. No. 14/176,936, entitled "Systems and Methods for Synchronizing Optical Transmitters" and filed on Feb. 10, 2014, which is incorporated herein by reference.

Note that it is unnecessary for each anchor 21, 22, and 24 in the same room 301 to transmit the same room identifier. For example, in one embodiment, each anchor transmits its respective network address via an optical signal that is received by the tag 52. As will be described in more detail below, the server 42 may be provisioned with room data indicating which anchors are situated in which rooms. Thus, when the server 42 receives a tag status message that includes a room identifier in the form of a network address that uniquely identifies an anchor, the server 42 determines that the tag 52 is in the same room as the anchor. That is, the server 42 uses the provisioned room data to identify the room in which the tag 52 is located. In such example, the room identifier is unique to the anchor that optically transmitted it to the tag 52 and is used by the server 42 to identify the room in which the tag 52 is located. In yet other embodiments, other types of room identifiers may be communicated to the tag 52 for helping to determine the tag's current location.

Figure 4:
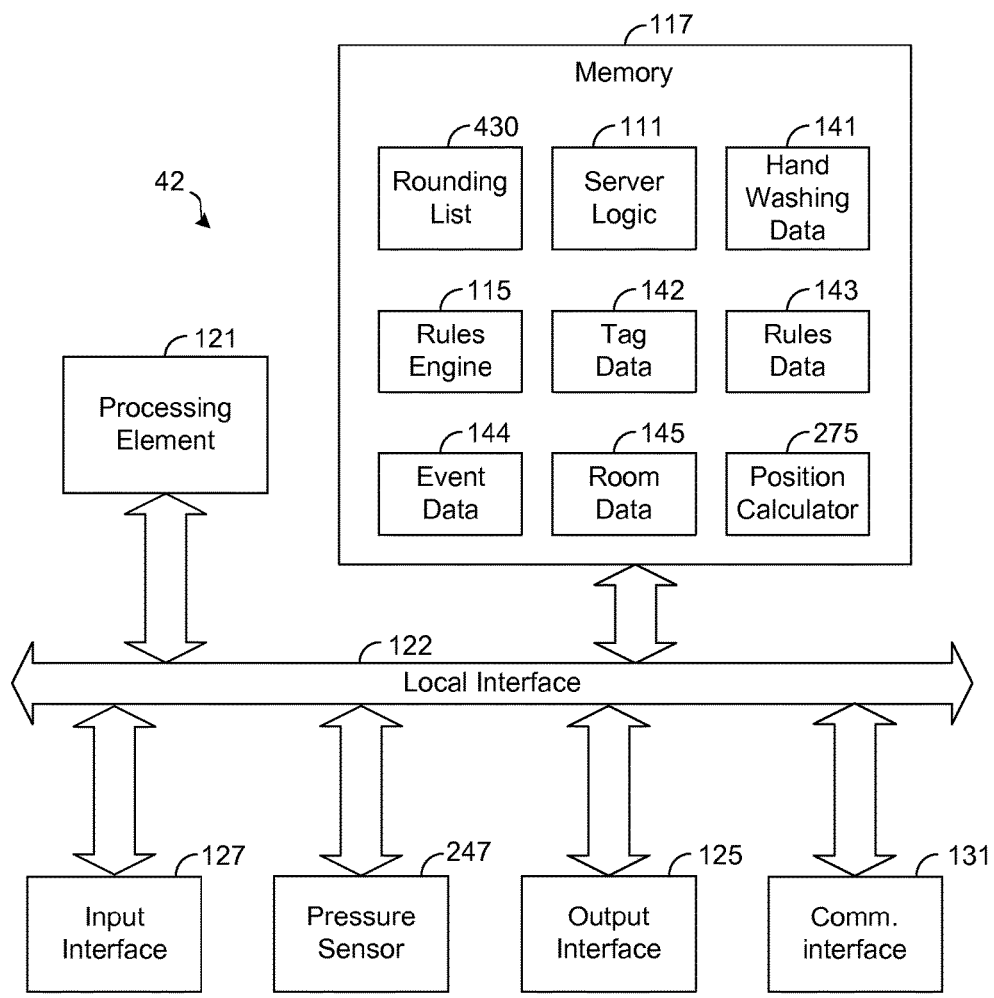
FIG. 4 is a block diagram illustrating an exemplary embodiment of a server, such as is depicted by FIG. 1.

FIG. 4 depicts an exemplary embodiment of the local server 42. As shown by FIG. 4, the local server 42 comprises logic 111, referred to herein as "server logic," for generally controlling the operation of the local server 42, as will be described in more detail hereafter, including communicating with the anchors 21-27 of the WSN 20. The local server 42 also comprises logic 115, referred to herein as a "rules engine," which will be described in more detail hereafter. The server logic 111 and the rules engine 115 can be implemented in software, hardware, firmware or any combination thereof. In the exemplary server 42 illustrated by FIG. 4, the server logic 111 and the rules engine 115 are implemented in software and stored in memory 117 of the server 42. Note that the server logic 111 and the rules engine 114, when implemented in software, can be stored and transported on any computer-readable medium for use by or in connection with an instruction execution apparatus that can fetch and execute instructions.

The exemplary server 42 depicted by FIG. 4 comprises at least one conventional processing element 121, which comprises processing hardware for executing instructions stored in memory 117. As an example, the processing element 121 may comprise a central processing unit (CPU) or a digital signal processor (DSP). The processing element 121 communicates to and drives the other elements within the local server 42 via a local interface 122, which can include at least one bus. Furthermore, an input interface 127, for example, a keypad, keyboard or a mouse, can be used to input data from a user of the local server 42, and an output interface 125, for example, a printer, monitor, liquid crystal display (LCD), or other display apparatus, can be used to output data to the user. Further, a communication interface 131 may be used to exchange data with the network 36 (FIG. 1).

As shown by FIG. 4, hand washing data 141, tag data 142, rules data 143, event data 144, and room data 145 are stored in memory 117 at the local server 42. The hand washing data 141 indicates the occurrence of hand washing events, such as when a user wearing a tag 52 is determined by the system 15 to have washed his or her hands. The tag data 142 indicates information about the tags 52, such as the approximate location (e.g., room) of each tag 52. The rules data 143 defines various rules that can be compared to the tag data 142, the hand washing data 142, and/or the room data 145 to determine when certain events of interest occur, such as a violation of a rule specified by the rules data 143.

As an example, assume that a rule defined by the rules data 143 requires a user wearing a particular tag 52 to wash his or her hands within a certain time period (e.g., 15 seconds or some other period) after entering a patient's room. The rules engine 115 is configured to analyze the hand washing data 141, the tag data 142, and the room data 145, as will be described in more detail hereafter, in order to determine when a violation of the rule occurs (i.e., when the user wearing the tag 52 fails to wash his or her hands within a certain amount of time after entering into a patient's room). When a violation occurs, the rules engine 115 logs the violation in the event data 144 and may take other actions as may be desired. As an example, the rules engine 115 may request the server logic 111 to transmit a notification message indicative of the event to the tag 52. In such case, the tag 52 may emit an audible or visual notification indicating an occurrence of a violation so that the caregiver or other users are aware that a violation has occurred. As an example, in one embodiment, the tag 52 activates a light source, such as one or more light emitting diodes, that can be seen by the caregiver. Such a visual indication may also be seen by the patient and thus notify the patient of the violation. In such case, the patient may ask about the purpose of the illuminated light source or, if the patient is aware that illumination of the light source indicates a rules violation, inform the caregiver of the rules violation. Accordingly, providing a visual or audio indication of the rules violation that can be seen or heard by the patient in addition to the caregiver increases the probability that the warning will be quickly noticed, such as before the caregiver actually touches the patient, so that corrective action can be taken in a timely manner, if possible. In other examples, other types of rules may be defined by the rules data 145.

Note that the rules engine 115 may be configured to warn a caregiver of an imminent violation in an effort to prevent the violation from occurring. For example, as a caregiver is approaching a patient without washing his or her hands, the rules engine 115 detect the occurrence of an event, referred to herein as a "warning event," where a warning is transmitted to the caregiver's tag before the occurrence of a violation. Such an event may be sensed based on an amount of time (e.g., 15 seconds) that elapses after the caregiver enters area, such as a room. When the rules engine detects a warning event, the rules engine 115 may request the server logic 111 to transmit a notification message indicative of the warning event to the tag 52. In response, the tag 52 may emit an audible or visual warning for indicating that a violation is imminent. Based on such warning, the caregiver may be reminded to wash his hands such that a rules violation is prevented.

Figure 5:
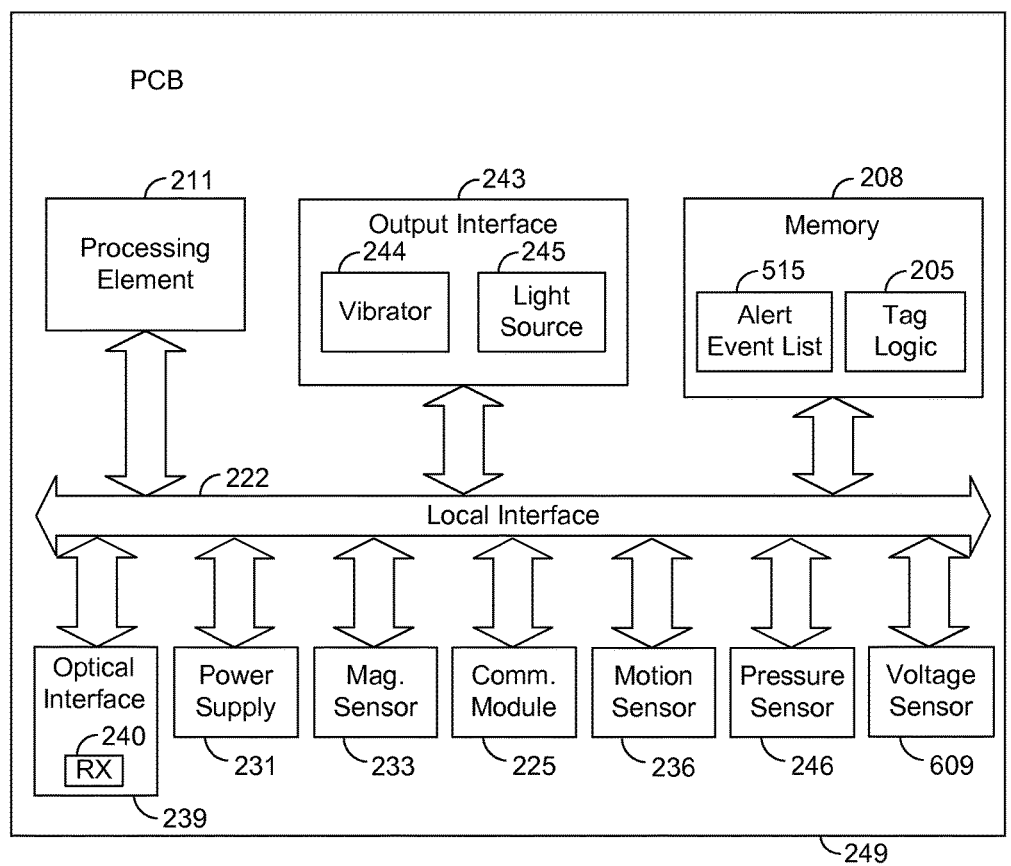
FIG. 5 is a block diagram illustrating an exemplary embodiment of a tag, such as is depicted by FIG. 1.

FIG. 5 depicts an exemplary embodiment of a tag 52. As shown by FIG. 5, the tag 52 comprises logic 205, referred to herein as "tag logic," for generally controlling the operation of the tag 52, as will be described in more detail hereafter. The tag logic 205 can be implemented in software, hardware, firmware or any combination thereof. In the exemplary tag 52 illustrated by FIG. 5, the tag logic 205 is implemented in software and stored in memory 208 of the tag 52. Note that the tag logic 205, when implemented in software, can be stored and transported on any computer-readable medium for use by or in connection with an instruction execution apparatus that can fetch and execute instructions.

The exemplary tag 52 depicted by FIG. 4 comprises at least one conventional processing element 211, which comprises processing hardware for executing instructions stored in memory 208. As an example, the processing element 211 may comprise a central processing unit (CPU) or a digital signal processor (DSP). The processing element 211 communicates to and drives the other elements within the tag 52 via a local interface 222, which can include at least one bus. In addition, the tag 52 has a communication module 225, which comprises an RF radio or other device for communicating wirelessly. The tag 52 also has a power supply 231, such as one or more batteries, which provide electrical power to the components of the tag 52.

In one exemplary embodiment, the tag 52 has a magnetic sensor 233, such as a compass, that is configured to sense a magnetic field. In this regard, the magnetic sensor 233 is configured to sense a magnetic field and determine an orientation of the tag 52. As an example, the magnetic sensor 233 may be configured to provide a value indicative of a direction (e.g., angle) of the sensor 233 and, hence, tag 52 relative to magnetic North. That is, the magnetic sensor 233 may be configured to function as compass by providing a value indicative of the tag's directional heading. The magnetic sensor 233 may also provide a raw magnetic flux density reading indicative of a magnitude of a magnetic field sensed by the sensor 233.

The tag 52 also has a motion sensor 236 that is configured to sense motion of the tag 52. In one exemplary embodiment, the motion sensor 236 comprises an accelerometer, but other types of sensors are possible in other embodiments. In addition, the tag 52 has an optical interface 239 that is configured to communicate (transmit or receive) with the optical interfaces of anchors 21-27. In one embodiment, the optical interface 239 is configured to communicate infrared signals but optical signals of other wavelengths may be communicated in other embodiments. The optical interface 239 may comprise an optical transmitter (not specifically shown in FIG. 5) for transmitting a wireless optical signal (e.g., infrared), and the optical interface 239 may comprise an optical receiver (RX) 240 for receiving an optical signal (e.g., infrared).

As shown by FIG. 5, the tag 52 has an output interface 243 that is configured to provide outputs to a user. The output interface 243 depicted by FIG. 5 comprises a vibrator 244 and a light source 145, such as a light emitting diode (LED), but other types of output devices (e.g., a speaker for audible output) are possible in other embodiments. In one exemplary embodiment, each component shown by FIG. 5 resides on and is integrated with a printed circuit board (PCB) 249. However, in other embodiments, other arrangements of the tag 52 are possible.

The tag 52 also comprises a pressure sensor 246 that is configured to sense ambient pressure. In one exemplary embodiment, the pressure sensor 246 is implemented as an altimeter that provides an altitude reading. Data from the pressure sensor 246 may be included in the tag status messages so that the server 42 is aware of the pressure or altitude sensed by the sensor 246. Such information may be useful in resolving which room or other area the tag 52 is located. As an example, in a building having multiple floors, the pressure sensor 246 can be used to determine on which floor the tag is located. Such information may be useful in deciding whether the tag 52 is located in a particular room or alternatively the room that is above or below such particular room on another floor.

In this regard, for each room, the room data 145 (FIG. 4) stored at the server 42 may indicate an altitude range in which the tag 52 is expected to be located if the tag 52 is in fact in the room. Based on other measurements, such as distance measurements between the tag 52 and anchors 21-27, the server logic 111 (FIG. 4) may determine that the tag is located in any one of a limited number of rooms, such as rooms that are above or below each other on multiple floors. Using the data from at least the pressure sensor 246, the server logic 111 may be configured to resolve in which of these rooms the tag 52 is located. In particular, the server logic 111 may select the room that is associated with the altitude range best matching the altitude indicated by the pressure sensor 246.

As known in the art, an altimeter operates on the principle that a change in altitude results in a change in atmospheric pressure since air is more dense at lower altitudes. However, atmospheric pressure is affected by other factors as well, such as temperature and weather (e.g., moving air masses). In one exemplary embodiment, the server 42 has a pressure sensor 247 (FIG. 4) for sensing atmospheric pressure. The pressure sensor 247 is preferably mounted at a fixed location so that its altitude is constant. Accordingly, any change in the readings of the pressure sensor 247 should be a result of changes in temperature and weather. The server logic 111 preferably uses the readings from the pressure sensor 247 in order to calibrate the readings from the pressure sensor 246 of the tag 52 thereby accounting for variations in temperature and weather so that the readings from the tag's pressure sensor 247 more accurately indicate the tag's altitude.

In another embodiment, pressure readings from the pressure sensor 78 (FIG. 2) of at least one anchor are used to calibrate or interpret the readings by the pressure sensor 246 of the tag 52. As an example, when an anchor is forwarding a tag status message to the server 42, the server 42 may be configured to compare the pressure reading taken by the tag 52 with the pressure reading taken by the anchor in order to estimate the tag's altitude relative to that of the anchor. For example, if the difference in the two measurements is below a predefined threshold, the server 42 may determine that the tag 52 is on the same floor as the anchor. Otherwise, the server 42 may determine that the tag 52 is on a different floor. In this regard, if the tag's pressure reading is lower than that of the anchor by at least a specified amount, the server 42 may determine that the tag 52 is on a floor higher than the anchor, and if the tag's pressure reading is higher than that of the anchor by at least a specified amount, the server 42 may determine that the tag 52 is on a floor lower than the anchor. In other embodiments, other techniques for determining the tag's location based on readings by the tag's pressure sensor 246 are possible.

In one exemplary embodiment, the tag 52 is coupled to a badge worn by a user, such as a caregiver at a healthcare facility. Thus, the tag is carried by the user as he or she works, such as visiting patients. In other embodiments, the tag 52 may be attached to a user or other asset via other techniques, and it is possible for the user to hold the tag 52 or insert the tag 52 into a pocket of the user's clothes for holding the tag 52 as the user moves.

Further, as described above, the tag logic 205 is configured to broadcast a tag status message via the communication module 225 (FIG. 5) from time-to-time. The tag status message includes various information about the tag 52. In one exemplary embodiment, the tag status message includes an identifier unique to the tag 52, referred to herein as "tag identifier," which may be the network address of the tag 52 in the WSN 20. The tag status message also includes the last room identifier received from an anchor 21-27 provided that such room identifier was recently received by the tag 52 (e.g., within a predefined time period, such as within the last 5 seconds). The tag status message may also include the current readings of the magnetic sensor 233 and the pressure sensor 246 at the time the message is sent from the tag 52.

Note that the rate at which the tag status message is repetitively transmitted is based on the motion sensor 236. In this regard, the tag logic 205 monitors the motion sensor 236 to determine when the tag 52 is moving. As an example, if the motion sensor 236 comprises an accelerometer, the tag logic 205 may be configured to compare the current acceleration reading from the sensor 236 to a predefined threshold. If the threshold is exceeded, the tag logic 205 determines that the tag 52 is moving. If the threshold is not exceeded, the tag logic 205 determines that the tag 52 is stationary. During periods of motion, the tag logic 52 is configured to transmit a tag status message more often than during periods when the tag is deemed to be stationary. As will be described in more detail hereafter, the tag logic 205 may transition the tag 25 into a sleep state between tag status messages. Thus, by transmitting the tag status message less frequently during periods when the tag 52 at rest, the tag 52 may remain in a sleep state longer thereby helping to conserve power when the location of the tag 52 is likely not changing. However, if the tag 52 is moving, the tag status message is transmitted more frequently helping the system 15 to identify a position or room change sooner.

When the in-room communication module 67 of an anchor 21-27 receives a tag status message, the module 67 is configured to measure a received signal strength of the message to determine a received signal strength indicator (RSSI) indicative of such measured signal strength. The information in the tag status message and the message's RSSI are stored in the anchor's memory 55. Such information is correlated with a timestamp indicating the time that the message is received by the anchor. This stored information is later transmitted to the local server 42, as will be described in more detail below.

FIG. 3 depicts two exemplary rooms 301 and 307 at a healthcare facility. The room 301 has a bed 310 for a patient and a sink 312 at which a person may wash his or her hands. In this regard, a dispenser 316 of a hand sanitizing solution (e.g., soap or antibacterial foam) is mounted on a wall 305 of the room 301 near the sink 312. In one exemplary embodiment, a node 322 of the WSN 20, referred to herein as a "dispenser node," is mounted or otherwise positioned on the dispenser 316. Like a tag 52, the dispenser node 322 can communicate with other nodes (e.g., anchors 21-27) of the WSN 20 but does not perform routing functions within the WSN 20. In other embodiments, the dispenser node 322 may perform routing functions, if desired.

The dispenser node 322 is configured to sense when a user dispenses hand sanitizing solution from the dispenser 316. In one exemplary embodiment, the node 322 comprises a motion sensor (not shown) for sensing when hand sanitizing solution is dispensed from the dispenser 316. In this regard, dispensing of a solution from the dispenser 316 creates vibrations that can be sensed and analyzed to determine that such dispensing, referred to hereafter as "hand washing event," has occurred. In other embodiments, other techniques may be used for detecting a hand washing event.

When the dispenser node 322 detects an occurrence of a hand washing event, the node 322 reports the event. In this regard, the node 322 transmits a message, referred to hereafter as "hand washing message," to an anchor 24 that is in the same room as the dispenser node 322 and/or another routing node of the WSN 20. For illustrative purposes, assume hereafter that the dispenser node 322 communicates with the anchor 24. The message transmitted by the dispenser node 322 includes an identifier of the dispenser node 322, which may be the network address of the node 322 in the WSN 20. The message also indicates the occurrence of a hand washing event and specifically includes a timestamp indicating the time of the detected hand washing event. The information from the message is stored in the memory 208 of the anchor 24 that receives the message. This stored information is later transmitted to the local server 42, as will be described in more detail below.

As shown by FIG. 3, the room 307 may be similarly equipped relative to the room 301. In this regard, the room 307 has an anchor 23, a bed 330, a sink 332, a dispenser 336, and a dispenser node 342 that are configured similar to and operate within the room 307 similar to the anchor 24, bed 310, sink 312, dispenser 316, and dispenser node 322, respectively.

From time-to-time (e.g., periodically), each anchor 21-27 is configured to transmit a message, referred to herein as "anchor status message," to the local server 42 (FIG. 1). Such message includes various information about the anchor. Specifically, in one exemplary embodiment, the anchor status message includes an identifier of the anchor, which may be the anchor's network address in the WSN 20. The anchor status message also includes the current measurement samples from each of the anchor's sensors 73-78 (FIG. 2). Such message further includes information received from tags 52 and dispenser nodes since the last anchor status message transmitted to the local server 42 by the anchor. As an example, for each tag status message received during such period, the anchor logic 50 includes the information in the tag status message as well as the message's RSSI and timestamp. In addition, for each hand washing message received during such period, the anchor logic 50 also includes the information in the hand washing message as well as the message's RSSI and timestamp. Note that, if desired, the anchor logic 50 may divide the information over multiple anchor status messages in order to keep the size of each anchor status message below a maximum threshold.

Upon receiving an anchor status message, the server logic 111 (FIG. 4) at the local server 42 is configured to store information from the message in the memory 117. In this regard, the server logic 111 is configured to store in the tag data 142 the tag information from the anchor status message (e.g., the information from the tag status messages). Thus, the tag data 142 can be analyzed to determine each tag's current location (e.g., room) within the healthcare facility as well as a history of the tag's location over time.

The server logic 111 is also configured to store in the hand washing data 141 the hand washing information from the anchor status message (e.g., the information from the hand washing messages). Thus, the hand washing data 141 can be analyzed to determine when hand washing events occurred at a particular dispenser 316 or 336.

The server logic 111 is further configured to store in the room data 145 sensor information from the anchor status message, such as samples from the sensors 73-78 of the anchor that transmitted the anchor status message.

The rules engine 115 is configured to analyze the tag data 142 to determine when events of interest occur. As an example, assume that a rule indicated by the rules data 143 is that a caregiver is to wash his or her hands within a certain time (e.g., 15 seconds) after entering the room 301. By analyzing the tag data 142, the rules engine 115 determines when a tag 52 carried by a caregiver enters the room 301. Based on the hand washing data 141, the rules engine 115 determines whether a hand washing event occurs at the dispenser 316 within 15 seconds after the caregiver's tag 52 has entered the room 301. If so, the rules engine 115 determines that the rule specified by the rules data 143 has not been violated. However, if no hand washing event is deemed to occur at the dispenser 316 within 15 seconds of the caregiver's tag 52 entering the room 301, the rules engine 115 detects a violation of the foregoing rule and logs such event in the event data 144. The rules engine 115 also notifies the server logic 111 of the violation, and the server logic 111 is configured to transmit a notification message, referred to herein as a "tag alert message," to the caregiver's tag 52. Such tag alert message is transmitted through the WSN 20 to the tag 52, which activates the vibrator 244 and the light source 245 in response to the message. Specifically, the vibrator 244 vibrates, and the light source 245 emits a certain color of light in an effort to warn the caregiver about the detected event. In other embodiments, other outputs may be generated based on the tag alert message. Based on the output provided by the output interface 243, the caregiver may be reminded to wash his or her hands before touching or further touching the patient in the room 301. In other embodiments, other types of rules may be defined by the rules data 143, and other types of events may be detected by the rules engine 115.

To better illustrate an exemplary operation of the system 15, assume that a caregiver wearing or otherwise carrying a tag 52 enters the room 301. Upon entering the room 301, the optical receiver 240 (FIG. 5) of the tag 52 detects the room identifier transmitted by the optical transmitter 84 (FIG. 2) of the anchor 24. In the next tag status message transmitted by the tag 52, the tag logic 205 includes such room identifier as well as the tag identifier of the tag 52 and possibly other data, such as the current readings of the magnetic sensor 233 and pressure sensor 246. The in-room communication module 67 of the anchor 24 receives such tag status message, and in the next anchor status message transmitted by the anchor 24, the anchor logic 50 of such anchor 24 includes at least the tag identifier of the tag 52, as well as the room identifier, magnetic sensor sample, pressure sensor sample, and timestamp from the tag status message. The anchor status message also includes the RSSI measured for such tag status message by the in-room communication module 67. Such anchor status message is transmitted by the backhaul communication module 66 through the WSN 20 and the LAN 36 to the local server 42.

Upon receiving such message, the server logic 111 is configured to update the tag data 142 to indicate that the tag 52 is now in the room 301. Based on such update, the rules engine 115 is aware that the tag 52 has now entered the room 301 and, thus, monitors the hand washing data 141 to determine whether a hand washing event occurs at the dispenser 316 within a predefined time (e.g., 15 seconds), referred to hereafter as "dispense-check period," of the detection of the tag 52 entering the room (e.g., when the tag 52 received the room identifier). If no hand washing event is detected for the dispenser 316 within the dispense-check period, the rules engine 115 detects a warning event or rules violation. In such case, the rules engine 115 logs the rules violation or warning event and triggers a tag alert message that is communicated to the tag 52, as described above, so that the tag's caregiver can be warned of the detected rules violation or warning event.

However, for illustrative purposes, assume that the caregiver does wash his or her hands within the dispense-check period. In such case, the dispenser node 322 detects when the caregiver activates the dispenser 316. Upon detection of such event, the dispenser node 322 transmits a hand washing message to the anchor 24, which receives such message via the in-room communication module 67 (FIG. 2). Such message includes an identifier of the dispenser node 322 and timestamp indicating when the detected hand washing event occurred. In the next anchor status message transmitted by the anchor 24, the anchor logic 50 of such anchor 24 includes at least the identifier of the dispenser node 322 and the timestamp from the hand washing message. Such anchor status message is transmitted by the backhaul communication module 66 through the WSN 20 and the LAN 36 to the local server 42.

Upon receiving such message, the server logic 111 is configured to update the hand washing data 141 to indicate the occurrence of the detected hand washing event. Thus, by analyzing the data 141, the rules engine 115 determines that a hand washing event occurs within the dispense-check period (i.e., within a predefined time of when entry of the caregiver into the room 301 is detected). In such case, the rules engine 115 does not detect a rules violation or warning event based on the caregiver entering the room 301. Therefore, the rules engine 115 does not log a rules violation or warning event and does not trigger a tag alert message.

Note that a portion of the dispense-check period may be before detection of the caregiver entering the room 301. In this regard, there may be a lag between the time that the tag 52 actually enters the room 301 and the time that entry into the room 301 is detected depending on various factors. For example, if entry into the room 301 is detected via optical transmission of room identifiers, as described above, optical interference may prevent the tag 52 from receiving a room identifier until after the tag's user has washed his or her hands at the sink 312. In such case, detection of the tag 52 entering the room 301 may occur after the user has washed his or her hands. In one exemplary embodiment, the dispense-check period is defined to be a predetermined amount of time (e.g., 15 seconds) before detection of the tag 52 entering the room 301 and a predetermined amount of time (e.g., 15 seconds) after such detection. Thus, a violation of the hand washing rule is not detected even if there is a short delay between the time that the user enters the room 301 and the time that such entry is detected by the system 15.

In one exemplary embodiment, the timing of the dispense-check period is controlled based on the locations of other tags 52 being monitored by the system 15. For example, if a first tag 52, referred to in this example as "Tag A," is determined to be in the room 301 before a second tag 52, referred to in this example as "Tag B," enters the room 301, then it is possible that the caregiver of Tag A may wash his or her hands before Tag B enters the room 301. In such case, the system 15 may miss a violation of the hand-washing rule if the dispense-check period includes time before entry of Tag B into the room 301. That is, the system 15 may erroneously associate the hand washing event by the caregiver of Tag A with Tag B even though the user of Tag B actually does not wash his or her hands after entering the room 301. In an effort to prevent such misses, the server logic 111 is configured to shorten the dispense-check period such that a hand washing event must occur within a tighter time period when multiple caregivers are determined to be in the same room. As an example, the dispense-check period may be defined such that it includes time only after Tag B enters the room 301. In such embodiment, the system 15 associates a hand washing event with Tag B for the purpose of determining whether a violation of the hand washing rule has occurred only if the hand washing event occurs after detection of the tag 52 entering the room 301. Thus, a hand washing event performed by the caregiver of Tag A in the room 301 prior to entry of Tag B should not cause the system 15 to miss a violation of the hand washing rule by user of Tag B. In other embodiments, other techniques for controlling the timing of the dispense-check period based on the relative positions of tags 52 or otherwise are possible.

Note that techniques other than or in addition to communication of the room identifier via optical (e.g., infrared) signals may be used to determine in which room a tag 52 is located. As an example, in one embodiment, the location (e.g., coordinates) of the tag 52 is determined within a coordinate system so that the rules engine 115 can make decisions based on the coordinate location of the tag 52. In this regard, the local server 42 comprises logic 275, referred to herein as a "position calculator," that is configured to calculate the position of each tag 52 based on the tag data 142. Note that the position calculator 275 may be implemented in hardware, software, firmware, or any combination thereof.

In the instant embodiment, the room data 145 defines a map of the healthcare facility. Such map has a coordinate system, and locations of objects such as anchors 21-27, rooms, and dispenser nodes 316 within such coordinate system are indicated by the room data 145. In addition, a tag status message transmitted by the tag 52 is received by multiple anchors and reported to the server 42 by each of the multiple anchors. As an example, each anchor that receives a tag status message may be configured to report it to the server 42. In one exemplary embodiment, in order to reduce the traffic communicated by the system 15, a given anchor is configured to report a tag status message only if the RSSI for such message exceeds a predefined threshold.

When an anchor 21-27 reports a tag status message, the anchor includes information that can be used to determine the location of the tag 52 within the coordinate system defined by the room data 145. As an example, the anchor may measure the time of flight of the tag status message via known techniques and include such time of flight information in the anchor status message that is transmitted to the server 42. Based on the time of flight measured by multiple anchors 21-27 and the locations of these anchors 21-27, the position calculator 275 may be configured to use triangulation, trilateration, or some other positioning algorithm to determine the location (e.g., coordinates) of the tag 52 within the coordinate system defined by the room data 145.

In one exemplary embodiment, the location determination is made based on the RSSI measured for the tag status message.

In this regard, a signal is generally attenuated as it travels, and it is generally expected that a tag status message received by an anchor will have a lower RSSI value due to such attenuation the further that the tag 52 is from the anchor. Thus, the RSSI can be analyzed to estimate a distance of the tag 52 from the anchor. In an effort to improve the accuracy of the distance estimate, the position calculator 275 is configured to use samples from the magnetic sensors 73 and 233 of the anchors and tags 52, respectively, as will be described in more detail below.

In one exemplary embodiment, the tags 52 are designed so that transmissions from the tags 52 are directional. In this regard, each tag 52 has a shield composed of steel or some other material that tends to block transmission of energy in one direction (e.g., the direction toward the caregiver wearing the tag 52) while not impeding transmission energy in the opposite direction (e.g., a direction away from the caregiver wearing the tag 52). Thus, at a given distance from a tag 52, it is expected that the signal strength will be greater in front of the caregiver than in the back of the caregiver.

Moreover, it is generally expected that the RSSI for a tag status message will be lower if the transmission direction of the tag 52 is away from the anchor that is receiving the message. That is, the orientation of the tag 52 relative to the anchor that is receiving the tag status message from the tag 52 has a bearing on the RSSI measured for such message. In one exemplary embodiment, for a tag status message transmitted from a tag 52 to an anchor, the position calculator 275 is configured to compare the magnetic sample value of the tag 52 to the magnetic sample value of the anchor that is reporting the tag status message in order to estimate the distance of the tag 52 from such anchor. In this regard, if the tag 52 is oriented relative to the anchor such that its transmission energy is not directed toward the anchor, then the position calculator 275 estimates a higher distance value for a given RSSI relative to the distance value that would be estimated for the same RSSI if the tag 52 is determined to be oriented such that its transmission energy is directed toward the anchor.

In any event, based on the estimated distances of the tag 52 from the anchors that report the tag status message from such tag 52, the position calculator 275 determines the location of the tag 52 in the coordinate system defined by the room data 145 and updates the tag data 142 to indicate such location. Based on the tag location indicated by the tag data 142, the rules engine 115 can determine when the tag 52 has entered a particular room. Note that distance measuring techniques described above may be used in conjunction with the infrared communication techniques described above for determining in which room the tag 52 is located. As an example, the distance measuring techniques may be used as a backup in the event that infrared communication fails or is non-determinative. Also, the room identifier may be used to increase the confidence in the location estimate if both the location estimate and the room identifier indicate that the user is in the same room. If there is a discrepancy, the server logic 111 may be configured to resolve the discrepancy by using the input that is deemed to be most reliable. As an example, if the location estimate indicates that the tag 52 is in a different room relative to the one identified by the room identifier optically transmitted to the tag 52, the server logic 111 may be configured to discard the location estimate and determine that the tag 52 is in the room indicated by the room identifier. While such determination may be less precise in that the location of the tag 52 within the room is not known, use of the room identifier may yield a more reliable result in such an example. Yet other techniques for resolving conflicting measurements are possible in other embodiments.

In one exemplary embodiment, readings from the tag's magnetic sensor 233 are used to help determine the tag's location. As an example, the sensor 233 may be used to sense a magnetic profile of the area in which the tag 52 is located, and the position calculator 275 at the server 42 may be configured to estimate the tag's location based on the sensed profile. In this regard, the magnetic flux densities at various points within an area can be measured and stored to define a magnetic profile of the area. The fluctuations in magnetic flux density within a given area are likely unique such that that the area can be identified using its magnetic profile, which serves as a magnetic "fingerprint."

In such an embodiment, data (referred to hereafter as "magnetic profile data") defining the magnetic profiles of the areas in which tags 52 are to be used is generated and stored. Such magnetic profile data may be generated by moving a tag 52 within such areas while the tag's magnetic sensor 233 is used to capture magnetic readings. In such an example, for each reading, the tag's current location is determined according to the techniques described above, and location data indicative of the tag's current location is correlated with a reading from the magnetic sensor 233 indicating a magnitude of a magnetic field measured by the sensor 233. The location reading and magnetic sensor reading, referred to hereafter a "magnetic profile pair," define a sample of the area's magnetic profile. In one exemplary embodiment, the magnetic profile data is stored at the server 42 as part of the room data 145, although the magnetic profile data may be stored at other locations in other embodiments.

As an example, within a healthcare facility, the magnetic profile for each room may be measured and stored in memory 117 on a room-by-room basis. Thus, for any room in the healthcare facility, the position calculator 275 may access the room data 145 in order to determine the room's magnetic profile. In other embodiments, the magnetic profiles for other areas, such as hallways, floors, or wings, may be defined and used.

During operation as a tag 52 is moving and being monitored, the readings from the tag's magnetic sensor 233 are captured and transmitted to the server 42. The position calculator 275 is configured to compare several of the most recent readings of the magnetic sensor 233 to the magnetic profiles defined by the room data 145 in an effort to determine or confirm the tag's current location. Specifically, the position calculator 275 determines which room (or other area) has a magnetic profile that most closely resembles the readings from the magnetic sensor 233. If there is a sufficiently high correlation between such readings and the magnetic profile of a given room or other area, then the position calculator 275 may determine that the tag 52 is in such room or other area.

Note that the magnetic profile comparisons described above may be used in conjunction with other techniques for determining location in order to provide an improved location estimate. For example, using RSSI or other parameters according to the techniques described above, the position calculator 275 may be unable to conclusively determine the tag's current location. As an example, the position calculator 275 may be able to discern that the tag 52 is likely located in one of several possible locations but unable to resolve which of the possible locations is the tag's current location. In such a case, the position calculator 275 may use the magnetic profile comparisons to eliminate at least some of the possible locations or possibly resolve the tag's position to a single location. In this regard, the position calculator 275 compares recent readings from the tag's magnetic sensor 233 to the magnetic profiles for each of the possible tag locations. If the magnetic profile for one of the possible locations sufficiently matches the readings from the magnetic sensor 233, the position calculator 275 may determine that the tag 52 is currently at such location. In such an embodiment, the magnetic profile comparisons are used to select which of a limited number of possible locations is the most likely candidate for the tag's current location.

As an example, assume that the position calculator 275 makes location determinations based on RSSI. Also assume that the position calculator 275, based on RSSI measurements, determines that the tag 52 is located in either room 301 or 307 (FIG. 3) when the tag 52 is actually in room 301. In such an example, the position calculator 275 may compare recent measurements by the tag's magnetic sensor 233 to the magnetic profile defined for room 301 and the magnetic profile defined for room 307. Based on such comparisons, the position calculator 275 should determine that the magnetic profile for room 301 better matches the magnetic sensor readings than the magnetic profile for room 307. In response, the position calculator 275 may decide that the tag 52 is in room 301, thereby eliminating the room 307 as a possible candidate for the tag's location. In such an example, magnetic profile comparisons are used in conjunction with other location determination techniques in order to help the position calculator 275 to discern the tag's correct location. In other embodiments, the magnetic profile comparisons may be used with any number of other location determining algorithms to help the position calculator 275 determine the tag's current location.

In one exemplary embodiment, the tag 52 is configured to transmit at multiple power levels so that different sets of anchors hear the tag's messages depending on the transmission power level of each message and the tag's location. Based on which anchors hear which messages, the position calculator 275 can determine the tag's current location.

As an example, using techniques for determining location based on RSSI or other techniques, assume that the position calculator 275 determines that the tag 52 is in one of a number of possible rooms. Also assume that the tag 52 is configured to transmit a first tag status message, referred to hereafter as a low power (LP) message, and a second tag status message, referred to hereafter as a high power (HP) message. The LP message is transmitted at a lower power relative to the HP message and thus should have a shorter range. The tag 52 may be configured to transmit the two messages according to any desired algorithm. In one embodiment, the tag 52 transmits the messages in an alternating fashion such that every other tag status message is of the same type. That is, each LP message is followed by an HP message and vice versa. In other embodiments, other numbers of message types and transmission patterns are possible.

In the instant embodiment, assume that each anchor that receives a tag status message (whether it is an LP message or HP message) reports the tag status message if the RSSI of the message is above a predefined threshold. Thus, for any given tag status message, multiple anchors may report the tag status message to the server 42 depending on the tag's location.

In this regard, after the tag 52 transmits an LP message, a first set of anchors should hear and report the LP message. Thereafter, when it is time to transmit the next tag status message, the tag 52 transmits an HP message. Since the two messages have different transmit power levels, a different set of anchors should hear and report the HP message relative to the set of anchors that heard and reported the LP message.

Specifically, each anchor that hears the LP message should also hear the HP message since the HP message has a higher transmit power. Also, since the HP message should have a greater range, additional anchors (which are unable to hear the LP message) should hear and report the HP message. The position calculator 275, which is preferably aware of the respective locations of all of the anchors, can compare the locations of the set of anchors reporting the LP message with locations of the set of anchors reporting the HP message in order to determine information indicative of the location of the tag 52. Using such information, the position calculator 275 can eliminate at least some possible tag locations and possibly determine the tag's current location.

Figure 14:
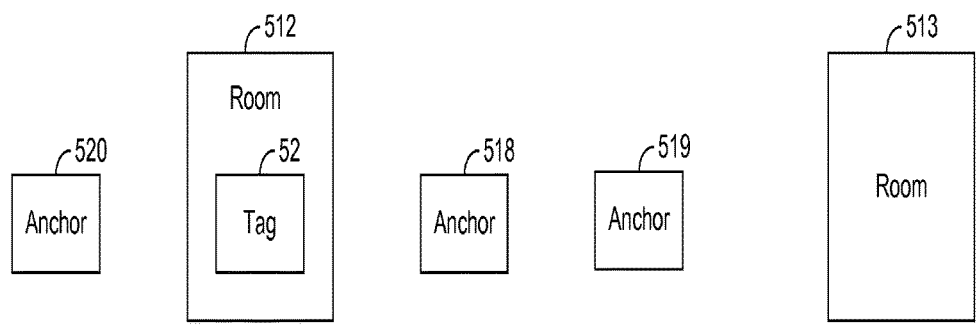
FIG. 14 depicts exemplary rooms in a healthcare facility for which a monitoring system, such as is depicted by FIG. 1, is used.

As an example, for illustrative purposes referring to FIG. 14, assume that the position calculator 275 is aware that the tag 52 is located in one of two possible rooms 512 or 513. Also, assume that an anchor 518 is closer to room 512 than to room 513 and that the anchor 518 is closer to the room 512 than the anchors 519 and 520. Further, assume that the tag 52 transmits an LP message that his heard by anchor 518 but not anchors 519 and 520, and assume that the tag 52 transmits an HP message that is heard by all three anchors 518-520. Using the information gleaned from the transmission of the location beacons, the position calculator 275 may determine that the tag 52 is closer to the room 512 thereby eliminating the room 513 as a possible location of the tag 52. In such example, the position calculator 275 may determine that the tag 52 is in the room 512. In yet other examples, other types of location information may be used to determine the location of the tag 52.

When the location of the tag 52 is determined, decisions by the rules engine 115 can be based on such location. As an example, rather than determining whether a hand washing event occurs within a certain time after a caregiver enters a room, the rules data 143 may be defined such that a violation or warning event occurs when a tag 52 enters a particular zone, referred to hereafter as "restricted zone," without the tag's caregiver washing his or her hands after entering the room. In such example, when the rules engine 115 determines that a tag 52 enters the room 301, the rules engine 115 monitors the hand washing data 141 to determine if a hand washing event occurs, as described above. However, rather than sensing a violation or warning event after a certain time period, the rules engine 115 instead determines when the tag 52 enters a restricted zone within the room 301 such as within a certain distance of the bed 310. If the restricted zone is entered before a hand washing event is detected, then the rules engine 115 detects a rules violation or warning event. However, if a hand washing event occurs before such restricted zone is entered, then the rules engine 115 does not detect a rules violation or warning event.

Note that the restricted zone may be relative to a position of the patient. In this regard, the patient may wear a tag 52 that communicates with the anchors 21-27 to enable the position of the patient to be determined similar to the techniques described above for determining the locations of caregivers. The restricted zone may be within a certain distance (e.g., three feet) of the patient's location. Thus, if a caregiver does not wash his or her hands after entering the patient's room, a hand washing violation should be detected and the caregiver warned before the caregiver reaches the patient.

Based on the locations of tags 52, the rules engine 115 may determine not just when a hand washing event occurs but also which tag 52 is associated with the hand washing event. In this regard, when a hand washing event occurs in a room, it is possible that multiple tags 52 may be located in such room. Using the respective locations of the tags 52, as indicated by the tag data 142, the rules engine 115 can determine which of the tags 52 is likely attached to the caregiver who caused the hand washing event. In particular, it is expected that such tag 52 will be close to the dispenser 316 and will be oriented in a direction facing the dispenser 316. Based on the location of a given tag 52 within the room and/or the orientation of the tag 52, as indicated by the tag's magnetic sensor 233, the rules engine 115 is configured to determine which tag 52 is associated with a detected hand washing event. If a tag 52 enters a room without being associated with a hand washing event in such room before expiration of a certain time period or by the time the tag 52 enters a restricted zone, the rules engine 115 detects a rules violation or warning event. However, if the tag 52 enters a room and thereafter is associated with a hand washing event in the room before expiration of the certain time period or by the time the tag 52 enters the restricted zone (depending on which event is defined by the rules data 143 to trigger a violation), then the rules engine 115 does not detect a violation or warning event.

From time-to-time, the server logic 111 is configured to transmit the hand washing data 141, the tag data 142, and the event data 144 to the remote server 46. The server logic 111 is also configured to transmit to the remote server 46 portions of the room data 145, such as the sensor data measured by the sensors 73-78 of the various anchors 21-27 of the network 20. Logic 400 (FIG. 1), referred to herein as a "data manager," at the remote server 46 is configured to analyze the data received from the local server 42 and/or to provide a user, such as a hospital administrator, access to such data for analysis. Note that the data manager 400 may be implemented in hardware, software, firmware, or any combination thereof.

As an example, it may be desirable for the temperature, the humidity, and noise level in the rooms of the healthcare facility to remain within a desired range. The data manager 400 may be configured to sense when the temperature, humidity, and/or noise level of a given room are outside of a predefined range for each respective parameter and log the event in the event data 144. Note that the desired range for a given parameter may change over time. As an example, a healthcare policy may require quiet periods when noise levels within certain rooms are to be reduced in order to ensure adequate rest time for patients. During such a quiet period, the predefined range for noise levels may be lower than for other times of the day. The data manager 400 determines when the noise level sample sensed by the audible sensor 75 of a given anchor 21-27 exceeds a predefined threshold for the room based on the time period associated with sample (i.e., the time of the sample as indicated by the sample's timestamp). If the foregoing threshold is exceeded, the data manager 400 detects a noise level violation for such sample. By reviewing the noise level violations detected by the data manager 400 over time, a hospital administrator or other user can determine how well caregivers are complying with noise level policies.

In some cases, the data manager 400 may access external databases or data that is sensed or maintained external to the network 20. As an example, caregivers may maintain patient records indicating certain conditions or events associated with the patients at the healthcare facility. The data manager 400 may access such records for comparing these records with the data acquired by the network 20.

As a mere example, caregivers may maintain in a database records indicating which patients acquired infections or other conditions while staying in a room of the healthcare facility. The data manager 400 may be configured to compare the event data 144 from the local server 42 with the patient records to determine whether any rules violations are related to (e.g., likely caused) the patient condition. For example, if a patient acquires an infection, the data manager 400 may determine and report whether any hand washing violations associated with the patient occurred within a predefined time of the infection. In this regard, the patient records may indicate the approximate time that the infection was noticed and the room number of the patient who acquired the infection. Knowing the time that the infection or other condition was noticed and the room number, the data manager 400 analyzes the event data 144 to determine whether any hand washing violations for the patient's room occurred in a certain time period (e.g., one or two days) prior to the time that the infection was noticed. In one embodiment, the data manager 400 is configured to generate a list of such hand washing violations, if any, for each infection occurrence. Such list preferably includes the time of the hand washing violation and the tag identifier associated with the hand washing violation. Such list can be analyzed by a user, such as a hospital administrator, to help determine to what extent hand washing violations may be resulting in patient infections. As an example, the data manager 400 may be configured to provide various statistics, such as the percentage of infection occurrences that are associated with at least one hand washing violation within a certain time period of when the infection was noticed.

In another example, a policy at the healthcare facility may require a caregiver to enter a patient's room according to a predefined schedule (e.g., each hour) in order to check on a patient. Such policy is generally referred to as "nurse rounding." The data manager 400 may be configured to analyze the tag data 142 to determine whether certain caregivers are in fact checking on patients according to the nurse rounding policy. However, not all of the rooms may have patients. In one embodiment, the data manager 400 accesses external records indicating which rooms are occupied with patients and when, and the data manager 400 uses such data to detect violations of the monitoring policy. In this regard, if the data manager 400 determines that a particular caregiver did not enter a patient's room within a time period in which the caregiver should have checked on the patient in the room, the data manager 400 detects and logs a violation, referred to hereafter as a "rounding violation." However, if the caregiver during the same time period does not enter another room for which the external records indicate is not occupied by a patient, then the data manager 400 does not detect a rounding violation for such room since it should be unoccupied.

Note that it is possible for a patient to be out of a room for an extended time even though the patient is still assigned to the room according to the patient's records. In such case, the patient's records indicate that the patient is occupying the room even though he or she may be out of the room for an extended time, such as when tests are being performed on the patient or the patient is performing physical therapy in another part of the healthcare facility. In one exemplary embodiment, the system 15 is configured to automatically determine when the patient is actually in his or her room and account for the patient's real-time occupancy in deciding whether there are any rounding violations.

As an example, the patient may be attached to a tag 52 that communicates with the anchors 21-27 as described above so that the rules engine 115 can determine in which room the patient is located. While the patient is in his or her room, as indicated by the location of the patient's tag 52, the rules engine 115 monitors the tag 52 of a caregiver who is scheduled to perform nurse rounding for the patient. Note that rules data 143 (FIG. 4) may indicate which tag 52 is attached to or otherwise associated with a caregiver who is scheduled to perform nurse rounding. In this regard, the rules data 143 may correlate the tag identifier of the caregiver's tag with the tag identifier of the patient's tag and/or room identifier of the patient's room and indicate that the caregiver's tag should enter the patient's room according to a predefined schedule, such as every hour for a period of time (e.g., a duration of the caregiver's shift while working at the healthcare facility), referred to hereafter as "caregiver shift."

During the caregiver shift, the rules engine 115 based on the rules data 143 monitors the location of the caregiver's tag to confirm that it enters the patient's room according to the predefined schedule. If the rules engine 115 determines for a particular time period (such as during a particular hour of the caregiver shift) that the caregiver did not enter the patient's room, then the rules engine 115 detects an occurrence of a rounding violation provided that the patient is determined by the rules engine 115 to actually occupy the room during the particular time period. However, if the tag data 142 indicates that the patient's tag was not actually in the room during the time period, then the rules engine 115 refrains from detecting an occurrence of a rounding violation. Thus, a rounding violation is detected only if the patient is determined to actually occupy the room during the relevant time period.

In one exemplary embodiment, the tag data 142 is used to assist the caregiver in complying with the nurse rounding policy. In this regard, as shown by FIG. 1, a communication device 402 is configured to communicate with the local server 42 via the LAN 36 or otherwise. If desired, the communication device 402 may be communicatively coupled to the network access device 33, which provides access to the LAN 36. In other embodiments, the communication device 402 may be configured to communicate with the local server 42 or LAN 36 directly or through some other type of network, such as the WAN 44. The communication device 402 is any device capable of communicating with the server 42 and rendering (e.g., displaying) information from the server 42. As an example, the communication device 402 may be personal computer (e.g., a desktop or laptop) or a hand-held device, such as a personal digital assistant (PDA) or cellular telephone.

Based on the rules data 143 or otherwise, the server logic 111 is configured to define a list 430, referred to herein as "rounding list," indicating which rooms that a particular caregiver is to visit in order to comply with the applicable nurse rounding policy. The server logic 111 is configured to transmit such list 430 to the communication device 402, which is configured to render this list 430 to the caregiver so that he or she is aware of which rooms are to be visited during his or her shift. In addition, the server logic 111 is configured to update the list 430 based on the tag data 142 or otherwise to indicate which of the rooms are currently occupied by the patients assigned to such rooms. Thus, by viewing the list 430, the caregiver can determine which rooms should be visited by the caregiver during a particular time period in order to comply with the nurse rounding policy.

In addition, the list 430 may be dynamically updated as the caregiver visits the rooms or patients in order to indicate which rooms or patients still need to be visited during a particular time period (such as the current hour) in order to comply with the nurse rounding policy. As an example, at the start of a particular time period (such as an hour during the caregiver's shift), the server logic 111 may be configured to indicate which rooms are to be visited by the caregiver during the time period. Such rooms include the ones that (1) are assigned to patients, as indicated by the patient records, and (2) for which the assigned patient currently occupies, as indicated by the tag data 142 or otherwise. Note that the list 430 provided by the server logic 111 does not indicate that the caregiver should visit a room assigned to a given patient who is not currently located in the room. Thus, the caregiver is aware that such room does not need to be visited possibly preventing the caregiver from needlessly wasting time to visit the room for the purpose of attempting to check on a patient that is not actually in the room.

As the caregiver performs his or her rounds checking on patients, the server logic 111 tracks the caregiver's movements, as indicated by the tag data 142, and determines when the caregiver has visited a room that is on the caregiver's list 430 of rooms to visit for the current time period. Upon detection of such an event, the server logic 111 updates the list 430 of rooms to be visited by the caregiver to indicate that such room no longer needs to be visited during the current time period. The server logic 111 further communicates this update to the communication device 402 so that the list 430 rendered to the caregiver is updated in real-time in order to indicate which rooms still need to be visited in order to comply with the nurse rounding policy. Accordingly, at any time, the caregiver can view the list 430 in order to determine which rooms or patients should be visited within the current time period taking into account which rooms are occupied and which rooms or patients have already been visited by the caregiver during the current time period.

In one exemplary embodiment, the rooms in the list 430 are highlighted when displayed depending on how recently the rooms have been visited, how soon a visit is due, or whether a visit has been missed. For example, a particular room may be highlighted if a deadline for a visit is within a certain time period, such as the next five minutes, or has been passed. Thus, a caregiver may view the list 430 and quickly discern which rooms should be visited next.

In one exemplary embodiment, the rules engine 115 is configured to trigger a warning if a deadline for a caregiver visiting a room has not been satisfied within a certain time period. For example, a certain time (e.g., five minutes) before a deadline for visiting a room, the rules engine 115 may detect an event, referred to herein as a "visit warning event," if the room has not been visited in the current time period. In such case, the rules engine 115 may request the server logic 111 to transmit a notification message indicative of the visit warning event to the tag 52. In response, the tag 52 may emit an audible or visual warning indicating that a violation is imminent. Based on such warning, the caregiver may be reminded to visit the room such that a rules violation is prevented. However, if the deadline is passed without the caregiver visiting the room, the rules engine 115 may detect a rules violation and trigger a warning message for warning the caregiver, as described for a violation of a hand washing event, and the rules engine 115 may also log the rules violation. The warning transmitted for either a visit warning event or a violation may include the room number associated with the visit warning event or violation, and the tag 52 may be configured to communicate (e.g., display) the room number so that the caregiver is aware of which room is associated with the warning without having to access the list 430.

Note that any of various techniques may be used to sense whether a patient's room is occupied by the patient. As an example, rather than tracking the patient's location via a tag 52 carried by the patient, a room 301 may be equipped with an occupancy sensor 412, as shown by FIG. 3. The occupancy sensor 412 is configured to sense the presence of a person in the room 301. In one exemplary embodiment, the occupancy sensor 412 has a communication module (not specifically shown), which comprises an RF radio or other device for communicating wirelessly. The occupancy sensor 412 uses such communication module for communicating wirelessly with at least one anchor so that occupancy data can be reported to the server 42 via the backhaul channel. In this regard, the occupancy sensor 412 monitors conditions in the room 301 over some sample period to sense whether a person is present in the room during the sample period. If so, the occupancy sensor 412 transmits to the server 42 a message that includes data indicating the room 301 to be occupied. Otherwise, the sensor 412 transmits a message including data that indicates the room 301 to be unoccupied. Based on the messages received from the occupancy sensor 412, the server logic 111 determines whether the room is occupied for the purposes of assessing whether a rounding violation occurs and updating the list 430 of rooms or patients to be visited by a caregiver, as described above.

There are various techniques that can be used by the occupancy sensor 412 to detect whether the room 301 is occupied. In one exemplar embodiment, the occupancy sensor 412 comprises an infrared proximity sensor that is configured to detect the presence of an individual based on infrared signals. In this regard, the sensor 412 transmits infrared radiation and measures an amount of infrared radiation that is returned. If there is a change in the profile of the returned infrared radiation, then the sensor 412 senses movement. In one exemplary embodiment, the sensor 412 is mounted in close proximity to the bed 310 and the range of the sensor 412 is limited such that a person would need to be in or close to the bed 310 in order to trigger a detection. Such a feature helps to ensure that the patient is sensed when he or she is in the room, considering that patients typically spend a significant amount of time in the bed 310 while in the room 301, while preventing the sensor 412 from sensing occupancy when a person other than a patient enters the room 301, such as a caregiver entering the room for the purpose of moving equipment or cleaning.

In one exemplary embodiment, the data manager 400 is configured to detect events associated with care-based billing. In this regard, a policy at the healthcare facility might be to bill a surcharge to patients if they require assistance from caregivers more than a threshold number of visits in a given time period. The data manager 400 (FIG. 1) may be configured to track the number of "extra" times that caregivers visit the patient's room (e.g., the number of visits that exceed the threshold during a predetermined time period) and provide this information to logic 422 (FIG. 1), referred to herein as a "billing manager," which automatically charges the patient's account for the extra visits as will be described in more detail below. In other embodiments, other types of events may be tracked and analyzed by the data manager 400 in an effort to assist caregivers and administrators in managing and operating a healthcare facility.

As shown by FIG. 1, the remote server 46 has a billing manager 422 that is configured to track costs associated with patients and provide reports, such as invoices, regarding costs to be charged to the patients. As an example, the billing manager 422 may track the number of days that a patient stays in a room of the healthcare facility and indicate an amount owed by the patient for staying in the room. Data indicative of drugs administered to a patient and other services provided to the patient may be input so that the billing manager 422 can track the amount of costs and fees to be billed to the patient for such services. One such service may be a charge that is based on the number of times that a caregiver visits the patient, as described above.

In this regard, assume that a patient is allocated a certain number (x) of visits per day while staying in a room at the healthcare facility. If the number of visits in a day exceeds x, then the patient is to be billed a surcharge depending on the number of visits above x. In such example, the local server 42 is configured to store a value, referred to herein as "visit count value" in the event data 144 (FIG. 4) and to correlate this value with the patient (e.g., a patient identifier or room identifier for the room in which the patient is staying). At the beginning of a day or other time period, the server logic 111 is configured to initialize the visit count value to zero (0). For the day, the server logic 111 is aware of which caregiver or caregivers are assigned to the patient for checking on or otherwise caring for the patient. As an example, the rules data 143 may indicate the tag identifiers of such caregivers.

Each time the server logic 111 determines that one of the identified caregivers enters the patient's room based on the tag data 142 or otherwise, the server logic 111 increments the visit count value such that the visit count value is a running sum of the number of visits by the identified caregivers. However, the server logic 111 may configured to refrain from counting at least some visits by a caregiver, as will be described in more detail below, so that the visit count value represents a better approximation of number of separate instances for which a caregiver visit is required or requested.

As an example, assume that the server logic 111 determines, based on the tag data 142, that a tag 52 for one identified caregiver enters a patient's room while the tag 52 of another identified caregiver is in the same room. In such case, both caregivers may be assisting the patient for the same incident or condition such that it is desirable for the visit count value to be incremented only once even though two tags 52 enter the patient's room. Thus, based on the relative proximities of the caregiver tags 52, the server logic 111 may be configured to refrain from incrementing the visit count value in response to a determination that a tag 52 has entered the patient's room.

In addition, once the server logic 111 increments the visit count value in response to a determination that a caregiver tag 52 has entered the patient's room, the server logic 111 may be configured to refrain from updating the visit count value for a predefined amount of time after such detection. Thus, if the caregiver leaves the patient's room and returns a short time later, the server logic 111 does not increment the visit count value when the caregiver returns. In such example, both visits of the caregiver may be associated with the same incident or condition. As an example, the caregiver may temporarily leave the patient's room in order to retrieve an item useful for addressing the patient's condition for which the caregiver was originally called to the patient's room. In yet other examples, it is possible for the server logic 111 to control the visit count value in other ways.

In any event, the event data 144 provided to the data manager 400 preferably includes the visit count value for each day that the patient stays at the healthcare facility. The data manager 400 compares the visit count value to a predefined threshold, which may be equal to the number of visits allocated to the patient per day for no additional cost. Thus, if the visit count value exceeds the threshold, then the patient is to be billed a surcharge. In such case, the data manager 400 is configured to provide to the billing manager 422 data indicative of the amount that the visit count value exceeds the threshold. As an example, the data manager 400 may provide the visit count value to the billing manager 422 or the difference between the visit count value and the threshold. Based on such data, the billing manager 422 determines how much of a surcharge is to be billed, based on a desired billing algorithm, for excessive number of visits. The billing manager 422 may be configured to display the surcharge amount or generate a report indicative of the surcharge amount. As an example, the billing manager 422 may generate an invoice or cost summary that includes the surcharge amount to be billed to the patient.

Note that the billing manager 422 may be implemented in hardware, software, firmware, or any combination thereof. When the billing manager 422 and/or the data manager 400 are implemented in software, the configuration of the remote server 46 may be similar to that shown by FIG. 4 for the local server 42. As an example, the remote server may have a processing element (not specifically shown), which comprises processing hardware for executing instructions of the software. Other configurations of the billing manager 422 and data manager 400 are possible in other embodiments.

As described above, in an effort to reduce network traffic and congestion, it is possible for some of the nodes of the network 20 to act as proxies for other nodes of the network 20 for communication via the backhaul channel. For example, it is possible for a node to assimilate data from multiple nodes and to communicate the data from multiple nodes via the backhaul channel to the local server 42 so that it is unnecessary for each of the nodes to communicate over the backhaul channel. In such embodiment, data from multiple nodes may be consolidated into a single message in order to reduce the number of messages that must be transmitted in order to convey all of the data.

In one exemplary embodiment, various anchors are selected to function as proxies for other nodes, such as tags and other anchors, for the purpose of communicating with the local server 42 via the backhaul channel. Further, the selection of the anchors to serve as proxies is based on how the anchors are powered. In this regard, it is possible for some anchors to be powered from an AC power source, such as a wall outlet, while other anchors are powered via a DC power source (e.g., batteries). Referring to FIG. 2, when an anchor is powered by an AC power source, the anchor's power supply 71 is configured to receive an AC power signal and to convert the AC power signal into a DC power signal compatible with the electronics of the anchor. As an example, it is common for an AC signal of 120 Volts and 60 Hertz to be available in North America. The power supply 71 may be configured to convert such signal to a lower voltage (e.g., 5 to 10 Volts) DC signal for powering the components of the anchor. In other embodiments, other types of AC signals may be received and converted by the power supply 71. An anchor that receives an external AC power signal and converts such signal to a DC power signal for powering components of the anchor shall be referred to herein as an "AC anchor." An anchor that has a DC power source, such as batteries, for generating a DC power signal or that receives a DC power signal from an external DC power source shall be referred to herein a "DC anchor."

In one exemplary embodiment, only AC anchors are selected to function as proxies for communicating across the backhaul channel. In this regard, functioning as a proxy is expected to consume more power, making AC anchors more attractive for performing this function since they effectively have unlimited power resources (unlike DC anchors, which may be powered by batteries having a finite life expectancy).

In an effort to simplify the architecture of the network 20, the proxies are selected on a room-by-room basis. That is, during network configuration, at least one AC anchor is situated in each room and is selected as the proxy to be used for the other nodes that are located in that same room.

As an example, referring to FIG. 3, assume that the anchor 24 is an AC anchor and that the anchors 21 and 22 are DC anchors. In such example, the AC anchor 24 is selected as a proxy for anchors 21 and 22 in the same room 301. The AC anchor 24 also serves as a proxy for the dispenser node 322 and the occupancy sensor 412 that are within the same room 301. Thus, when a DC anchor 21 or 22 is to report an anchor status message to the server 42, the anchor 21 or 22 is configured to transmit the anchor status message via the in-room channel to the AC anchor 24, which serves as a proxy for the nodes within the room 301. The AC anchor 24 is configured to store the message and thereafter, when the AC anchor 24 is ready to send a message to the server 42 via the backhaul channel, the AC anchor 24 includes in such message the data of the anchor status message received from the DC anchor 21 or 22. Thus, the AC anchor 24 reports, via the backhaul channel, to the server 42 the data of the anchor status message that is received from the DC anchor 21 or 22. Similarly, data from the occupancy sensor 412 or the dispenser node 322 is transmitted to the AC anchor 24 via the in-room channel, and the AC anchor 24 thereafter reports the data to the server 42 via the backhaul channel. As an example, when the dispenser node 322 detects the occurrence of a hand washing event, the dispenser node 322 transmits to the AC anchor 24 a hand washing message indicative of the occurrence of the hand washing event. Such message includes data indicating that a hand washing event has been detected, the network address of the dispenser node 322, and a time stamp indicating the time of detection of the hand washing event. Thereafter, the AC anchor 24 reports such information to the local server 42 via the backhaul channel. Note that exemplary techniques and protocols for communication across the backhaul channel will be described in more detail below.

Note that timestamps may be useful to ensure that the server 42 is aware of when events occur, but the transmission of timestamps is unnecessary. In this regard, timestamps may be omitted in an effort to reduce the amount of data that must be communicated via a network. In such embodiments, messages are communicated in real time so that the server 42 can assume that an event reported to the server 42 recently occurred. In many cases, it is unnecessary for the server 42 to be aware of the precise time that a particular event occurred.

In addition to serving as a proxy for the DC nodes 21 and 22, the dispenser node 322, and the occupancy sensor 412 that are in the same room 301, the AC anchor 24 also serves as a proxy for any tags 52 that are located in the same room 301, as briefly mentioned above. In this regard, when the AC anchor 24 receives a message from a tag 52, the anchor logic 50 of such AC anchor 24 is configured to determine whether the tag 52 is located in the same room 301 as the AC anchor 24. If not, the anchor logic 50 does not process the message for communication to the server 42. However, if the anchor logic 50 determines that the tag 52 is in the same room 301, then the anchor logic 50 stores the message and thereafter reports the data of the message to the local server 42 via the backhaul channel. In such embodiment, only one anchor serves as a proxy for such tag 52 thereby limiting the number of anchors attempting to transmit the tag's messages to the server 42. Note that as the tag 52 moves from room-to-room, the anchor that serves as the tag's proxy changes.

There are various techniques that can be used to determine whether a tag 52 is located in the same room as the anchor. As an example, as described above, RSSI values measured for signals communicated from the tag 52 can be used to determine in which room the tag is located. However, for illustrative purposes, it will be assumed hereafter, unless indicated otherwise, that a room identifier optically transmitted from the anchors is used to determine in which room the tag 52 is located. As described above, in such embodiment, each anchor 21, 22, and 24 in the room 301 optically transmits a room identifier to the tag 52. After receiving a room identifier via the optical channel, the tag 52 may be configured to report the room identifier to the server 42, as described above. In this regard, the tag 52 may transmit via the in-room channel a message that includes a tag identifier that identifies the tag 52 and the room identifier that is received via the optical channel. If desired, the message may include other parameters, such as a reading of the tag's magnetic sensor 233 or other component.

Upon receiving the tag's message, the anchor logic 50 is configured to determine whether the room identifier in such message identifies the room 301 in which the anchor 24 is located. If not, the anchor logic 50 discards the message without further processing it. However, if the room identifier does identify the room 301 associated with the anchor 24, then the anchor logic 50 is configured to store the message and thereafter report the data of the message to the local server 42 via the backhaul channel, as described above. In other embodiments, other techniques may be used to determine whether an anchor 24 that receives a message from a tag 52 should serve as a proxy for that tag 52. In particular, it is unnecessary for such decision to be based on whether the tag 52 and anchor 24 are in the same room, and the decision may be based on other factors, such as for example the proximity of the tag 52 relative to the anchor as determined by the message's received signal strength. For example, if the RSSI of the message is above a predefined threshold, then the anchor 24 may be configured to serve as a proxy for the tag 52 by reporting the message's data to the local server 42 via the backhaul channel. In other embodiments, yet other techniques may be used.

In one exemplary embodiment, each network access device 33 and 34 serves as a proxy for the local server 42 for the purpose of communicating data from the server 42 across the backhaul channel of its respective sub-network 28 or 29. Thus, when the local server 42 transmits a message that is to be received by any node within the sub-network 28, the local server 42 transmits such message to the network access device 33 that serves as a proxy for the local server 42 relative to such sub-network 28. The network access device 33 stores the message and thereafter communicates the message via the backhaul channel such that it is received by the message's intended destination.

Figure 6:
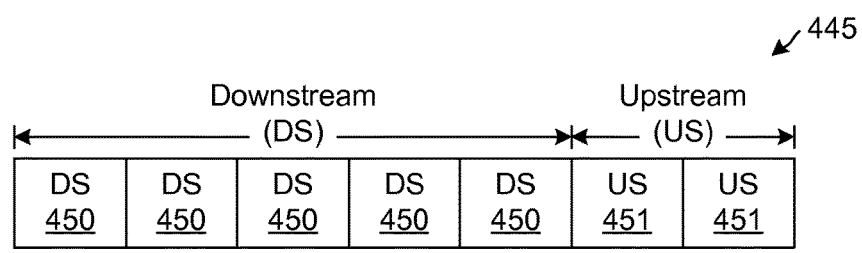
FIG. 6 is a block diagram illustrating an exemplary format for a frame used for communication across a backhaul channel.

In an effort to prevent data collisions and increase the efficiency of the network 20, the backhaul channel for each sub-network 28 and 29 is time division multiplexed. As an example, FIG. 6 depicts an exemplary frame 445 for the backhaul channel of the sub-network 28. As shown by FIG. 6, the frame 445 is divided into multiple time slots respectively assigned to the proxies (e.g., AC anchors and network access device 33) in the sub-network 20. For each time slot, only the proxy assigned to the respective time slot is permitted to transmit across the backhaul channel, except that the messages may be retransmitted by other nodes as will be described in more detail below.

For simplicity of illustration, assume that the network access device 33 serves only two rooms 301 and 307, which are shown by FIG. 3, although in actuality the network access device 33 may serve any number of rooms or proxies in other embodiments. In the instant example, assume that the anchor 24 is an AC anchor serving as a proxy for nodes in the room 301, as described above, and assume that the anchor 23 is an AC anchor serving as a proxy for nodes in the room 307. As used hereafter, an anchor that serves as a proxy for at least one other node shall be referred to as a "proxy anchor." In the instant example, only the proxy anchors 23 and 24 communicate with the network access device 33 in the upstream direction via the backhaul channel, except that the other anchors 21 and 22 may serve as hops for the messages from the proxy anchors 23 and 24 so that these messages can reach the network access device 33.

As shown by FIG. 6, the frame 445 is divided into downstream time slots 450 and upstream time slots 451. The downstream time slots 450 are assigned to the network access device 33 so that only downstream signaling from the network access device 33 is permitted during these time slots 450. In this regard, for one embodiment, the network access device 33 transmits a multicast message, referred to herein as "downstream multicast message," during the downstream time slots 450. Each anchor 21-24 that receives such downstream multicast message is configured to retransmit the message until its time-to-live value reaches a predefined threshold. Such retransmissions of the downstream multicast message are permitted during the downstream time slots 450, although the anchors 21-24 are not permitted to transmit upstream messages during the time slots 450. Thus, the downstream multicast message should propagate through the sub-network 28 so that it reaches at least all of the proxy anchors 23 and 24 that serve as proxies for other nodes of the sub-network 28. In at least one embodiment in which the anchors communicate optically with the tags 52, the downstream multicast message reaches all of the anchors 21-24 of the sub-network 28, and these anchors 21-24 use the downstream multicast message as a synchronization signal for synchronizing their optical transmitters for the optical channels, as further described above.

Each of the upstream time slots 451 is assigned to a respective proxy anchor 23 or 24 of the sub-network 28. In the instant embodiment, there are only two proxy anchors 23 and 24 in the sub-network 28, and FIG. 6 shows only two upstream time slots 451, one assigned to proxy anchor 23 and the other assigned to proxy anchor 24. However, in other embodiments, any number of proxy anchors and upstream time slots are possible. Each proxy anchor 23 and 24 is permitted to transmit upstream during its respective time slot 451 to which it is assigned. In one exemplary embodiment, when a proxy anchor 23 or 24 is permitted to transmit upstream, it transmits a multicast message. Each anchor 21-24 that receives such upstream multicast message is configured to retransmit the message until its time-to-live value reaches a predefined threshold. Thus, the upstream multicast message should propagate through the sub-network 28 so that it reaches the network access device 33.

In one exemplary embodiment, the downstream multicast message transmitted during the time slots 450 is used by the proxy anchors to synchronize to the frame 445. That is, for each such anchor 23 and 24, reception of the front end of the multicast message marks the beginning of the frame 445, and each anchor 23 and 24 makes any appropriate timing adjustments to account for drift and other timing variations so that the anchor 23 or 24 begins transmitting upstream at the beginning of its respective upstream time slot 451. That is, the timing of the upstream transmissions by the anchor 23 or 24 is based on the time that the anchor begins to receive the frame's downstream multicast message from the network access device 33. Such downstream multicast message is periodically transmitted by the network access device 33.

Note that the use of multicast messaging is typically unreliable in that multicast messages are typically broadcast without acknowledgments being communicated by the nodes that receive them. This is in contrast to unicast messages for which a receiving node typically transmits an acknowledgement so that the transmitting node is aware of whether the unicast message has been successfully received. If such an acknowledgement is not received, the transmitting node may attempt to retransmit the message.

As described herein, multicast messaging is used for the backhaul channel in an effort to reduce network traffic, including the communication of route discovery messages and acknowledgments that would otherwise be used for unicast messaging. In addition, an architecture for the multicast messaging may be defined for helping to ensure successful communication of the multicast messages.

In this regard, each proxy anchor 23 and 24 in normal operation is expected to transmit during its respective upstream time slot 451. As an example, at a minimum, a given proxy anchor 23 or 24 may be configured to transmit one or more sensor readings from the anchor's sensors 73-78. If the proxy anchor 23 or 24 has other data to transmit upstream as well, such as messages from tags 52 or other nodes for which the anchor 23 or 24 serves as a proxy, then the proxy anchor 23 or 24 may also transmit at least a portion of this other data in its respective upstream time slot 451. Thus, for each frame 445, the network access device 33 expects to receive at least some data from each proxy anchor 23 and 24.

Further, as indicated above, each proxy anchor 23 and 24 uses the downstream multicast message transmitted by the network access device 33 during the downstream time slots 450 for synchronizing its upstream transmissions. If a proxy anchor 23 or 24 fails to successfully receive the frame's downstream multicast message, then such proxy anchor 23 or 24 refrains from attempting to transmit upstream during the frame. Thus, if the network access device 33 fails to receive an upstream transmission from a proxy anchor 23 or 24 during a frame, then the network access device 33 assumes that such proxy anchor 23 or 24 did not successfully receive the downstream multicast message previously transmitted in the downstream time slots of the same frame. In such case, the proxy anchor 23 or 24 may not have received any data destined for it in the downstream multicast message. Thus, the network access device 33 is configured to retransmit such downstream data in the next downstream multicast message for the next frame. The network access device 33 continues to attempt a retransmission of this downstream data for the proxy anchor 23 or 24 until the device 33 receives an upstream transmission from the proxy anchor 23 of 24 indicating that this proxy anchor 23 or 24 has successfully received the downstream data previously transmitted to it. Accordingly, even though multicast messaging is used, the system 15 is capable of ensuring that downstream data transmitted by the network access device 33 to a proxy anchor 23 or 24 is successfully received by such proxy anchor 23 or 24.

Figure 7:
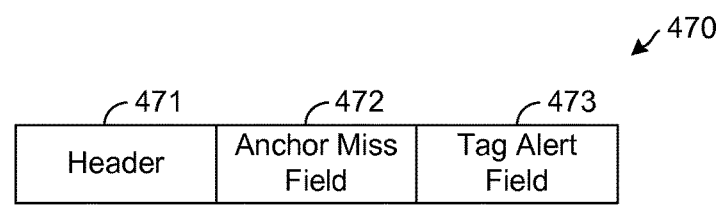
FIG. 7 is a block diagram illustrating an exemplary downstream multicast message.

An exemplary format of the downstream multicast message 470 is shown by FIG. 7. As shown by FIG. 7, the downstream multicast message 470 has a header 471, an anchor miss field 472, and a tag alert field 473. The header 471 indicates various control information about the message. As an example, the header 471 includes information to indicate message type (e.g., that the message 470 is a multicast message), including a multicast group identifier and a time-to-live value.

The anchor miss field 472 indicates which proxy anchors from which the network access device 33 did not receive an upstream transmission for the last frame. As an example, the anchor miss field 472 may include a list of proxy anchors for which the network access device 33 did not receive an upstream transmission in the last frame. In this regard, as indicated above, the network access device 33 expects to receive an upstream transmission from each proxy anchor 23 and 24 of the sub-network 28 during the upstream time slot 451 respectively allocated to the proxy anchor. If the network access device 33 fails to successfully receive an upstream transmission from a particular proxy anchor 23 or 24 during the anchor's respective upstream time slot 451, then the network access device 33, when sending the next downstream multicast message 470 for the next frame, includes the network address of such proxy anchor in the anchor miss field 472. In other embodiments, other techniques are possible for indicating from which proxy anchors the network access device 33 fails to receive an upstream transmission in the last frame. As an example, the anchor miss field 472 may include a bit mask having a bit for each proxy anchor 23 and 24. For each proxy anchor from which the network access device 33 did not receive an upstream transmission during the last frame, the network access device 33 may be configured set the corresponding bit in the bit mask.

Accordingly, by analyzing the anchor miss field 472, each proxy anchor 23 and 24 can determine whether the network access device 33 successfully received the upstream data transmitted by such proxy anchor in the last frame. If the anchor miss field 472 indicates that the network access device 33 did not receive the proxy anchor's data in the last frame, then the proxy anchor 23 or 24 may retransmit such data in the next frame. Thus, even though multicast messaging is being used for the backhaul channel, the system 15 is able to ensure reliable communication in both the upstream and downstream directions.

Referring again to FIG. 7, the downstream multicast message 470 also includes a tag alert field 473 indicating which tags 52 are to be alerted in response to a detection of a rules violation by the server 42. In this regard, as described above, the local server 42 is configured to cause a tag 52 to emit a warning when the server 42 determines that a rules violation has occurred. As an example, the local server 42 may instruct a tag 52 of a caregiver to emit a warning when the tag 52 enters an unauthorized area or approaches a patient without the caregiver washing his or her hands. Such warning may be effectuated through the use of the tag alert field 473.

In this regard, when the server logic 111 at the local server 42 determines that tag 52 is to be alerted, the server logic 111 transmits a tag alert message that includes the tag identifier (e.g., network address) of the tag 52 to be alerted. As will be described in more detail below, such tag alert message is effectively broadcast to each of the anchors 21-27 of the network 20 so that each anchor 21-27 is aware to transmit a tag alert message to the tag 52 in the event that the tag 52 establishes communication with such anchor.

Note that, for each alert event, the server logic 111 correlates an event indicator with the tag identifier of the tag 52 to be alerted, and this event indicator is included in the tag alert message transmitted from the server 42. Preferably, each event indicator is unique to the alert event for which the tag alert message is being transmitted. That is, a different event indicator is used for a different alert event. For example, when the rules engine 115 detects a violation of a rule such that a particular tag 52 is to be alerted to cause the tag 52 to emit a warning, a new event indicator is generated for this alert event. If the rules engine 115 detects a separate violation for the same tag 52, another new event indicator is preferably generated for this separate violation. Thus, when a node receives two alert messages identifying the same tag 52, the node can determine whether both messages are correlated with the same alert event by comparing the event indicators in the messages.

To better illustrate the foregoing, assume that a caregiver of a tag 52 commits a rules violation that results in an alert event for which the server 42 broadcasts a tag alert message identifying the tag 52. To help ensure reliability, multiple anchors may attempt to communicate the tag alert message to the tag 52. However, since each of the tag alert messages emanates from the same alert event, each such tag alert message should have the same event indicator. Once the tag 52 has issued a warning in response to a tag alert message with a given event indicator, the tag 52 is preferably configured to ignore other tag alert messages that have the same event indicator. Thus, multiple warnings for the same alert event are prevented. Moreover, if the tag 52 receives a tag alert message having an event indicator that the tag 52 has not previously received, then the tag 52 is aware that the tag alert message is for a different alert event relative to those for which other warnings have already been generated. Thus, the tag 52 is configured to issue a warning in response to a tag alert message having a new event indicator that has not been previously received by the tag 52.

In any event, when the network access device 33 receives a tag alert message from the local server 42, the network access device 33 is configured to store the tag identifier and the event indicator (referred to hereafter as "identifier/indicator pair") of such message in memory. That is, the network access device 33 maintains a list of identifier/indicator pairs, referred to hereafter as the "tag alert list," to be reported to the anchors 21-24 of the sub-network 28. When transmitting the downstream multicast message 470, the network access device 33 includes in the tag alert field 473 each identifier/indicator pair that is in the foregoing tag alert list.

Once the network access device 33 confirms that each proxy anchor 23 and 24 of the sub-network 28 has successfully received a particular identifier/indicator pair according to the techniques described above for ensuring reliable communication using multicast messaging, the network access device 33 removes such identifier/indicator pair from its tag alert list. This prevents the network access device 33 from continually transmitting the identifier/indicator pair after it has been successfully received by each proxy anchor 23 and 24 of the sub-network 28.

Upon receiving a new identifier/indicator pair from the network access device 33, the proxy anchors 23 and 24 communicate the identifier/indicator pair to the other anchors 21 and 22 of the sub-network 28. As an example, the proxy anchor 24 communicates the identifier/indicator to each anchor 21 and 22 for which the anchor 24 serves as a proxy. In one exemplary embodiment, the proxy anchor 24 transmits a multicast message that includes the identifier/indictor pair. Such multicast message preferably has a time-to-live value set such that the message is not retransmitted by the nodes that receive it (e.g., a time-to-live value set to one). Assuming that the anchors 21 and 22 are within one hop of the anchor 24 (i.e., in direct communication with the anchor 24), each of the anchors 21 and 22 should receive such multicast message even though it is not retransmitted by any of the nodes that receive it. If desired, a similar architecture as that described above for communication between the proxy anchors and the network access device 33 may be used to ensure reliable communication among the proxy anchor 24 and that anchors 21 and 22 that it services. Also, it is possible for the proxy anchor 24 to transmit a multicast message and assume that it is received by each anchor 21 and 22 without attempting to confirm that it is actually received.

Each anchor 21-24 of the sub-network 28 that receives a given identifier/indicator pair from the network access device 33 stores such pair in memory. In this regard, each anchor 21-24 maintains a tag alert list 502 (FIG. 2) indicative of identifier/indicator pairs received from the network access device 33. Each entry of the tag alert list 502 stores a respective identifier/indicator pair and is correlated with a time value indicating when such identifier/indicator pair was stored in the list 502. Each entry is also correlated with a valid indicator indicating whether the entry is valid. When an identifier/indicator pair is stored in the entry, the anchor logic 50 initializes the valid indicator to a value indicating that the entry is valid. After a predefined amount of time has expired since storage of the identifier/indicator pair to the list 502, the anchor logic 50 updates the entry's valid indicator such that it indicates that the entry is invalid. Accordingly, a particular identifier/indicator pair is marked as valid only for a limited time. That is, the identifier/indicator pair expires after a predefined amount of time. Any entry marked an invalid may be overwritten by a new identifier/indicator pair or otherwise discarded.

Thus, the tag alert list 502 essentially stores a list of tags 52 that are to be notified of an alert event so that the tag 52 may issue a warning. As will be described in more detail hereafter, if a tag 52 attempts to communicate with an anchor 21-24 for which a valid entry in its tag alert list 502 identifies the tag 52, then the anchor 21-24 is configured to send a tag alert message to such tag 52. In response, the tag logic 205 of the tag 52 may issue a warning. Note that the an anchor does not attempt to transmit tag alert messages for invalid entries such that the use of the valid indicator in the tag alert list 502 prevents a tag alert message from being transmitted to the tag 52 for an expired identifier/indicator pair.

In this regard, it is generally desirable for a caregiver to receive a warning of a rules violation a short time after occurrence of the rules violation so that the caregiver associates the warning with the event that triggered the warning. If the warning is received too long after occurrence of the rules violation, then the caregiver may be confused as to the purpose of the warning. By transitioning entries of an anchor's tag alert list 502 to an invalid state after they become stale, an anchor 21-24 will transmit a tag alert message to a tag 52 only if the identifier/indicator pair associated with the tag alert message has been stored in the anchor for a short time. If the identifier/indicator pair has been stored in the anchor for too long of a time period such that the pair has expired, the anchor is effectively disabled from sending a tag alert message based on such pair.

Accordingly, a tag 52 should receive a tag alert message from an anchor only if the associated rules violation recently occurred.

As shown by FIG. 5, each tag 52 stores an alert event list 515 indicating the event indicator of each tag alert message received by the tag 52. When the tag 52 receives a tag alert message that identifies the tag 52, the tag logic 205 searches the list 515 for an event indicator matching the event indicator in the tag alert message. If there is a match, then the tag 52 has previously received a tag alert message associated with the same alert event, and the tag logic 205 refrains from issuing a warning in response to the tag alert message. However, if there is no match, then the tag 52 has not previously received a tag alert message associated with the same alert event (e.g., rules violation). In such case, the tag logic 205 issues a warning. As an example, the tag logic 205 may activate the vibrator 244 and/or the light source 245 in order to provide a warning to the tag's user. The tag logic 205 also adds the message's event indicator to the alert event list 515 so that future warnings in response to tag alert messages associated with the same event are prevented.

In one exemplary embodiment, the tag 52 is configured to spend a significant amount of time sleeping in an effort to conserve the tag's power resources and, specifically, to extend the useful life of batteries that are used to power the tag 52. As described above, the tag 52 may transition to a sleep state in which components of the tag 52 are deactivated so that they consume less power. While in such a sleep state, the functionality of the tag 52 is limited. As an example, the communication module 225 may be deactivated such that wireless communication with the tag 52 is not possible until the tag 52 awakens from its sleep state and activates the communication module 225.

Figure 8:
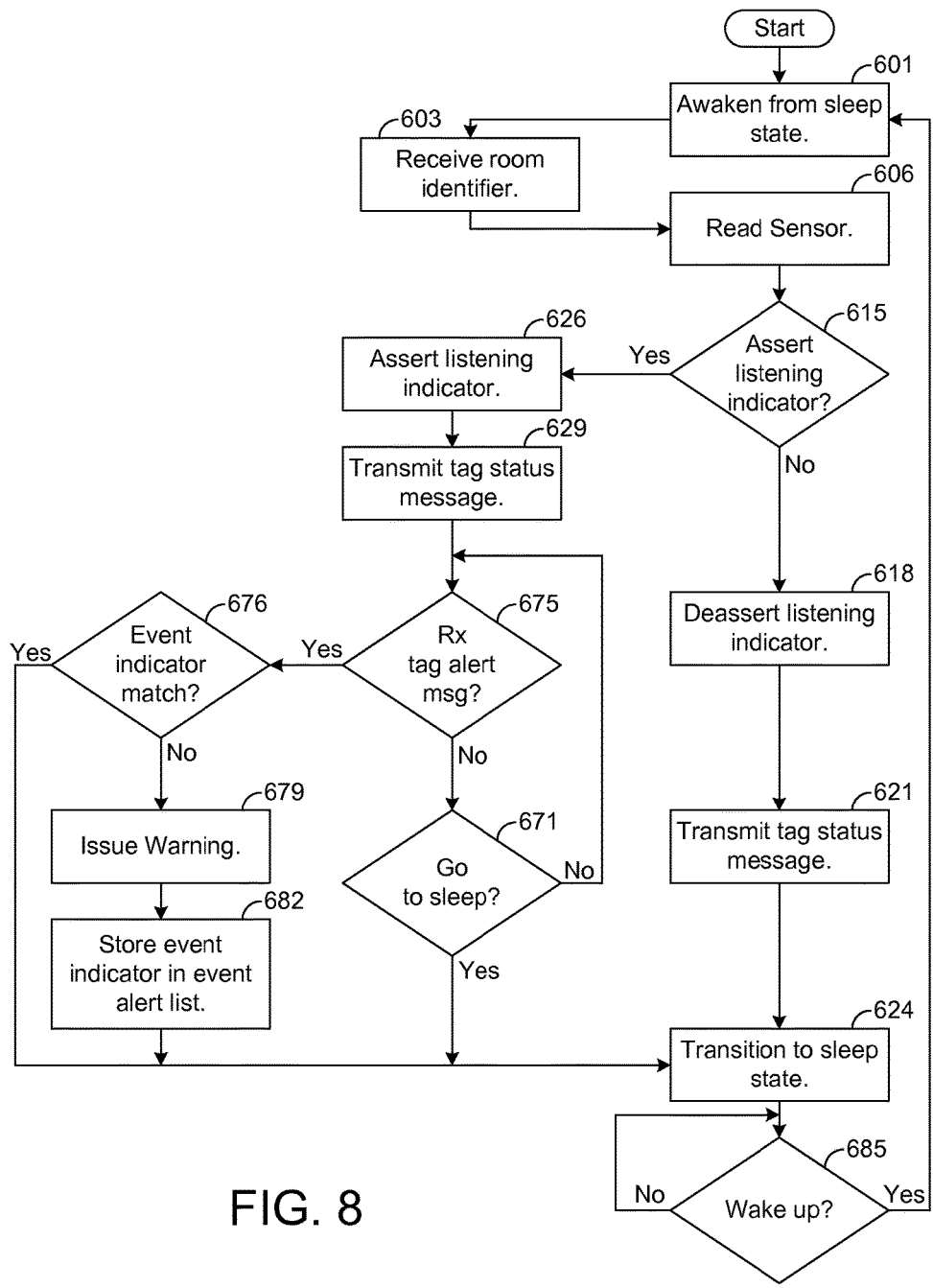
FIG. 8 is a flowchart illustrating an exemplary operation of a tag, such as is depicted by FIG. 1.

The tag 52 is configured such that it awakens from its sleep state from time-to-time, looks for a room identifier, transmits a tag status message, and then transitions back to a sleep state. FIG. 8 depicts an exemplary algorithm for controlling the tag 52 as it transitions into and out of sleep states.

Referring to FIGS. 3 and 8, assume that the tag 52 awakens from a sleep state in block 601 while in room 301. As shown by block 603, the tag 52 looks for a room identifier that is transmitted from a nearby anchor via the optical channel. In the current example, the tag 52 is within a line of sight of anchors 21, 22, and 24 and may receive a room identifier from any of these anchors. For illustrative purposes, assume that the room identifier transmitted by a given anchor is the anchor's network address. In such embodiment, the room data 145 (FIG. 4) is provisioned to indicate which room each of the anchors 21-27 is located. Thus, based on the network address received by the tag 52, the server logic 111 can identify the room in which the tag 52 is likely located.

As will be described in more detail below, the tag logic 205 of the tag 52 is configured to transmit the received room identifier via a tag status message using the in-room channel. However, before transmitting such message, the tag logic 205 may read one or more sensors and include sensor data in the tag status message, as shown by block 606. In one exemplary embodiment, the tag's power supply 231 has a voltage sensor 609 (FIG. 5) that senses a voltage of at least one battery of the power supply 231, and the tag logic 205 is configured to include a reading of this voltage sensor 609 in the tag status message. If the sensed voltage falls below a threshold, the server logic 111 is configured to warn at least one user of the condition. In other embodiments, the tag logic 205 may read other types of sensors, such as the magnetic sensor 233 and/or pressure sensor 246, and report sensor data from such other sensors via the tag status message.

However, before transmitting the tag status message, the tag logic 205 determines whether to assert an indicator, referred to hereafter as "listening indicator," in the tag status message, as shown by block 615 of FIG. 8. In this regard, as will be described in more detail hereafter, the tag logic 205 is configured to sometimes transition the tag 205 to a sleep state immediately after transmitting a tag status message in an effort to conserve the tag's power resources. In such case, an anchor that receives the tag status message will not have an opportunity to further communicate with the tag 52 before the tag 52 transitions to a sleep state. That is, by the time the anchor receives the tag status message and is ready to transmit a response to the tag status message, the tag 52 will already be in a sleep state and, thus, unable to receive messages from the anchor until the tag 52 later awakens from its sleep state. Therefore, in such situations, the tag logic 205 is configured to deassert the listening indicator in the tag status message, as shown by block 618, in order to indicate to any receiving anchor that the tag 52 will not be listening immediately after transmission of the tag status message. Thus, if an anchor receives a tag status message having a listening indicator that is deasserted, the anchor does not attempt to communicate with the tag 52 in response to the tag status message, thereby reducing network congestion by preventing the anchor from attempting to transmit messages to a tag 52 that is not listening for such messages.

After deasserting the listening indicator in block 618, the tag logic 205 transmits the tag status message via the in-room channel using the communication module 225 (FIG. 5), as shown by block 621 of FIG. 8. In one exemplary embodiment, the tag status message is a one-hop multicast message. That is, the tag status message is a multicast message with its time-to-live value set sufficiently low so that any node that receives the message does not attempt to retransmit it. Thus, only nodes in direct communication range with the tag 52 actually hear the tag status message. In other embodiments, other types of messages are possible, and it is possible for the tag status message to hop through any number of nodes. In any event, after transmitting the tag status message, the tag logic 205 transitions the tag 52 to a sleep state, as shown by block 624 of FIG. 8.

In some situations, as will be described in more detail hereafter, the tag 52 remains awake for a predefined amount of time after transmission of a tag status message in order to listen for replies from any anchors that may receive such message. In such case, the tag logic 205 asserts the listening indicator in the tag status message before transmitting the tag status message, as shown by blocks 626 and 629.

Figure 9:
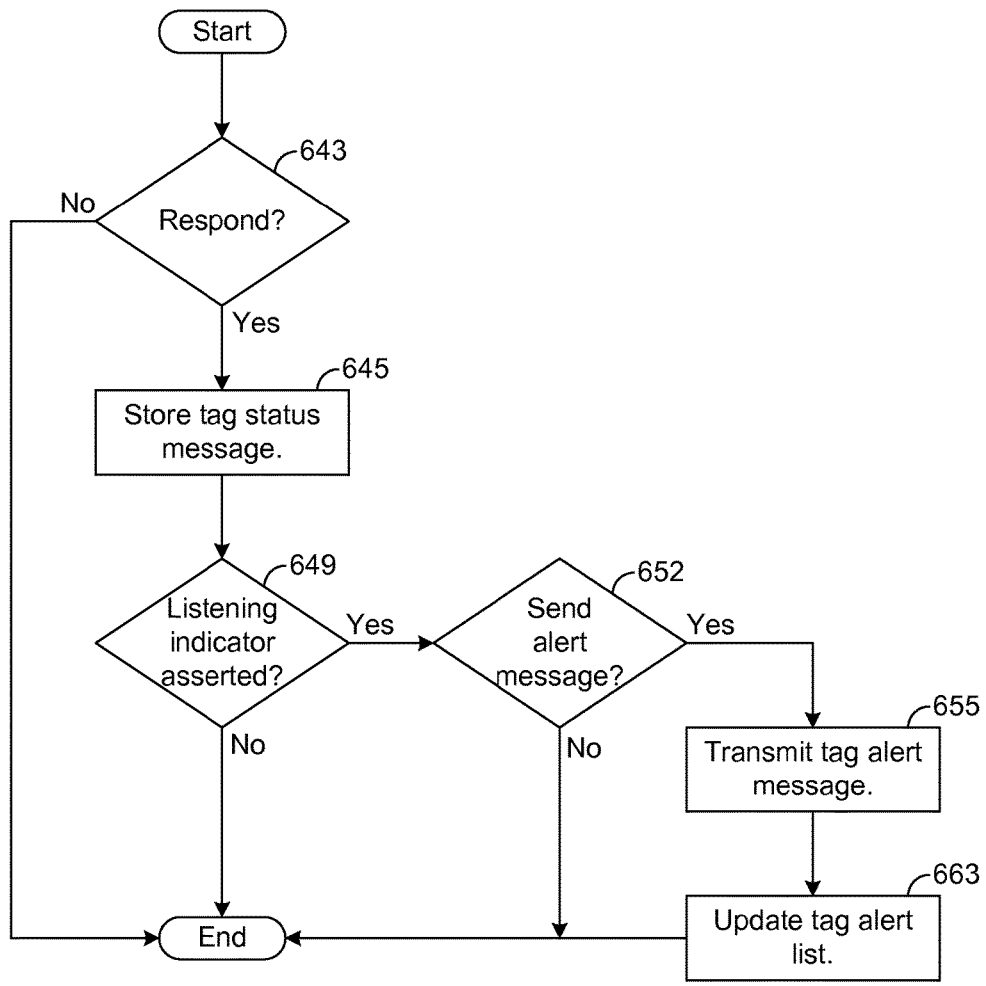
FIG. 9 is a flowchart illustrating an exemplary operation of an anchor, such as is depicted by FIG. 1, in handling a tag status message.

FIG. 9 shows an exemplary method for handling a tag status message at an anchor. For illustrative purposes, assume that a tag status message transmitted by the tag 52 is received by the anchor 24, which is a proxy anchor for the room 301. In one exemplary embodiment, as will be described in more detail below, only the proxy anchor for the room identified by the tag status message attempts to respond to the tag status message. This prevents multiple anchors from attempting to report the tag status message to the server 42, and it also prevents multiple anchors from attempting to alert the tag 52 via a tag alert message, as will be described in more detail below. In other embodiments, other architectures are possible where multiple nodes attempt to alert the tag 52 and/or report the tag status message to the server 42.

As shown by block 643 of FIG. 9, after receiving a tag status message, the anchor logic 50 determines whether to respond to the tag status message. In one embodiment, the anchor logic 50 is configured to make such determination based on the room identifier that is included in the tag status message. In this regard, the anchor logic 50 decides to respond to the tag status message if the room identifier of the message identifies the room 301 for which the anchor 24 serves as a proxy. That is, if the room identifier is the network address of any of the anchors 21, 22, or 24 within the room 301, then the anchor logic 24 decides to respond to the message. In such case, the anchor logic 24 stores the contents of the tag status message, as shown by block 645, so that the data from this message can be transmitted to the local server 42 via the backhaul channel at a later time. In this regard, as described above, such data is transmitted to the network access device 33 during an upstream time slot allocated to the anchor 24, and the network access device 33 transmits such data to the local server 42 via the LAN 36.

If the anchor logic 50 of the receiving anchor 24 determines that the room identifier does not identify the room 301 of this anchor 24, then the anchor logic 50 makes a "no" determination in block 643. In such case, the anchor logic 50 does not store the tag status message for later transmission to the server 42 and also does not attempt to alert the tag 52 as will be described in more detail below. Thus, even if the tag status message is received by multiple proxy anchors, only one such proxy anchor will attempt to communicate the tag status message to the server 42 and possibly alert the tag 52, assuming that there is only one proxy anchor for the identified room.

As shown by block 649 of FIG. 9, the anchor logic 50 also checks the listening indicator of the tag status message in order to determine whether the tag 52 is listening for a reply from the anchor 24. If the listening indicator is deasserted indicating that the tag 52 is not listening, the anchor logic 50 performs no further processing of the tag status message. That is, the method shown by FIG. 9 ends.

However, if the listening indicator is asserted indicating that the tag 52 is listening for a reply, then the anchor logic 50 determines whether to send a tag alert message to the tag 52, as shown by block 652 of FIG. 9. In one embodiment, the anchor logic 50 compares the tag identifier of the tag status message to the tag alert list 502 (FIG. 2) stored in memory 55 to determine whether a valid entry of the tag alert list 502 has the same tag identifier. If not, then there is no tag alert message to be sent to the tag 52. However, if a valid entry of the tag alert list 502 does identify the tag 52, then the anchor logic 50 transmits a tag alert message to the tag 52 via the in-room channel, as shown by block 655. As described above, such tag alert message includes a tag identifier identifying the tag 52 and an event indicator. In one exemplary embodiment, the tag alert message is a one-hop multicast message. That is, the tag alert message is a multicast message with its time-to-live value set sufficiently low so that any node that receives the message does not attempt to retransmit it. Thus, only nodes in direct communication range with the transmitting anchor 24 actually hear the tag alert message. In other embodiments, other types of messages are possible. As will be described in more detail below, the tag alert message causes the tag 52 to issue a warning, assuming that the tag 52 has not previously received a tag alert message having the same event indicator.

After transmitting the alert message, the anchor logic 50 updates the tag alert list 502, as shown by block 663, so that a future alert message will not be generated by the anchor 24 based on the transmitted identifier/indicator pair in the future. As an example, the anchor logic 50 may invalidate the entry so that it is not used to generate a tag alert message until at least the identifier/indicator pair currently stored therein has been overwritten.

Referring again to FIG. 8, after the tag 52 transmits a tag status message in block 629, the tag logic 205 waits a predefined amount of time for a reply before going to sleep. Specifically, the tag logic 205 waits for a tag alert message that might be transmitted from an anchor that receives the tag status message. In this regard, based on clock 69 (FIG. 2), the tag logic 205 tracks an amount of time that elapses since transmission of the tag status message by the tag 52. Once a predefined amount of time (e.g., 35 milliseconds) expires without the tag 52 receiving a tag alert message, the tag logic 205 makes a determination in block 671 to go to sleep. In such case, the tag logic 205 transitions to a sleep state, as shown by block 624.

However, if the tag 52 does receive a tag alert message identifying the tag 52 before expiration of the predefined time period, then the tag logic 205 determines whether to issue a warning based on the received alert message. Specifically, in response to a tag alert message that includes the tag identifier (e.g., network address) of the tag 52, the tag logic 205 compares the event indicator in the alert message to the event indicators in the alert event list 515 (FIG. 5) in order to determine whether there is a match, as shown by blocks 675 and 676 of FIG. 8. If so, then the tag logic 205 has previously issued a warning for the same event that is associated with the current tag alert message. Such warning may have been issued in response to a tag alert message from another anchor. In response to a match, the tag logic 205 does not issue a new warning and instead transitions to a sleep state, as shown by block 624.

If the event indicator in the alert message does not match any of the event indicators stored in the alert event list 515, then the tag 52 has not previously issued a warning in response to the same event that is associated with the tag alert message received from the anchor 24. In such case, the tag logic 205 is configured to issue a warning, as shown by block 679. In one exemplary embodiment, the tag logic 205 activates the vibrator 244 (FIG. 5) and the light source 245 (FIG. 5) such that these components vibrate and emit light, respectively. In other embodiments, other techniques for warning a user are possible. As shown by block 682 of FIG. 8, the tag logic 205 is configured to store the event indicator of the tag alert message in the alert event list 515. Thus, if the tag 52 later receives another tag alert message having the same event indicator, the tag 52 refrains from issuing another warning. That is, the tag 52 is configured to issue a single warning for the same event, although the tag 52 may be configured to issue any number of warnings in other embodiments. After issuing a warning and updating the alert event list 515 in blocks 679 and 682, the tag logic 50 is configured to transition the tag 52 to a sleep state, as shown by block 624.

After going to sleep, the tag logic 205 leaves the tag 52 in the sleep state for a period of time before deciding to awaken the tag 52 out of its sleep state, as shown by blocks 685 and 601. In one exemplary embodiment, the tag 52 awakens periodically, such as every second, in order to discover the room in which it is located and to broadcast its status. Also, the duration of the sleep state may be based on the motion sensor 236 (FIG. 5), as described above. For example, the duration may be shortened if motion is detected. However, as noted above, the tag 52 does not necessarily listen for a reply (e.g., an alert message) each time that it awakens to transmit a tag status message. There are various algorithms that can be used to determine whether the tag 52 should listen for a reply after transmitting a tag status message.

In one exemplary embodiment, the tag logic 205 is configured to determine when it has entered a new room and to listen for a reply from anchors when it has entered a new room. Such a determination can be achieved by comparing the room identifier received in block 603 after awakening from a sleep state to the room identifier previously received by the tag 52 before transitioning to the same sleep state. If the compared room identifiers identify different rooms, then the tag logic 205 is aware that the tag 52 has likely entered a new room. In response to such determination, the tag logic 205 makes a "yes" determination in block 615 such that it asserts the listening indicator in block 626 and listens for a reply after transmitting a tag status message in block 629. In such a situation, since a new proxy anchor is likely responding to the tag status message, there is an increased chance that tag 52 might receive an alert message. That is, the new proxy anchor now responding to the tag status message may have a valid entry in its tag alert list 502 that identifies the tag 52. Thus, it is generally desirable for the tag 52 to listen for a reply when it is expected that a new anchor is responding to the tag status message, such as when the tag 52 enters a new room.

While a tag 52 remains in the same room, the tag 52 will from time-to-time listen for a reply after transmitting tag status messages so that the proxy anchor for that room will have an opportunity to report a newly-discovered alert event to the tag 52. As an example, the tag logic 205 may be configured to listen for a reply to every other tag status message. In one embodiment, the tag 52 listens at a decaying rate while it remains in the same room. In this regard, the rate at which the tag 52 listens for replies may decrease the longer that the tag 52 remains in the same room. For example, the tag 52 may initially listen each time a tag status message is transmitted by the tag 52, but after a predefined period of time begin listening for every other tag status message. After yet another predefined amount of time, the tag 52 may listen for every third tag status message. Once the tag enters a new room, the rate may reset to a faster initial rate and then begin decaying again. As an example, the tag 52 may again begin listening each time a tag message is sent and then continue listening at a decaying rate, as described above. In other embodiments, other techniques for controlling when the tag 52 listens for replies to tag status messages are possible.

Figures 10, 11:
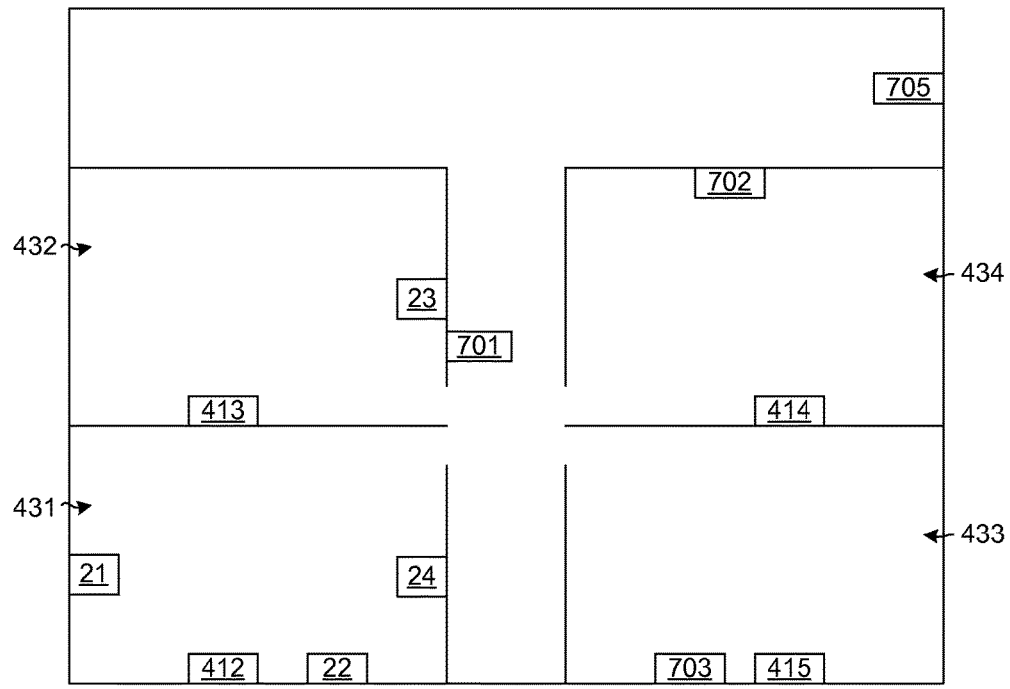
FIG. 10 depicts an exemplary display of a rounding list, such as is depicted by FIG. 4.
FIG. 11 depicts the rounding list of FIG. 10 after the list has been updated.

To better illustrate various aspects of the disclosure, assume that a caregiver wearing a tag 52 is to perform nurse rounding for the patients in the rooms 431-434 depicted by FIG. 10. Further assume that location determinations are based on room identifiers transmitted via an optical channel, as described above, and according to the nurse rounding policy, the caregiver is to check on each patient at least once per hour. Also, assume that patients are presently in rooms 431-433 but that the patient assigned to room 434 has been absent the room for an extended time. In addition, assume that the anchor 24 is a proxy anchor for the nodes in the room 431, anchor 23 is a proxy anchor for the nodes in the room 432, anchor 702 is a proxy anchor for the nodes in the room 434, and anchor 703 is a proxy anchor for the nodes in the room 433. Also, a proxy anchor 701 is situated in a hallway between the rooms 432 and 434, and another proxy anchor 705 is situated in another area of the same floor, such as close to a nursing station. For illustrative purposes, assume that proxy anchors 23, 24, and 701-705 are serviced by the network access device 33 (FIG. 1) and are members of the same sub-network 28.

In addition, situated in the rooms 431-434 are occupancy sensors 412-415 that are configured to sense whether a patient is presently in the sensor's respective room, as further described above. From time-to-time, each occupancy sensor 412-415 transmits a message, referred to hereafter as "occupancy status message," via the in-room channel to the proxy anchor that is within the same room as the occupancy sensor. Such occupancy status message indicates whether the occupancy sensor senses a patient in the room. As an example, the occupancy sensor 413 that is within the room 302 transmits an occupancy status message indicating that no patient is presently detected in the room 302. Such message includes a source address identifying the occupancy sensor 413. The occupancy status message transmitted by the occupancy sensor 413 may be received by multiple anchors, such as anchors 23 and 24, that are within a close proximity of the sensor 413. However, each proxy anchor is provisioned to know which nodes are within its respective proxy group. In the instant case, the anchor 24 is aware that it does not serve as a proxy for the occupancy sensor 413, and based on the source address included in the occupancy status message, the anchor 24 refrains from responding to the occupancy sensor message. However, recognizing that the occupancy sensor 413 is within its respective proxy group, the anchor 23 is configured to report the data of the occupancy status message to the server 42. Thus, the anchor 23 stores the occupancy status message for later transmission to the server 42. Later, during an upstream time slot 451 (FIG. 6) allocated to the anchor 23, the anchor 23 transmits the occupancy status message to the server 42 via the backhaul channel. The other proxy anchors 24, 703, and 702 of the rooms 431, 433, and 434 similarly transmit occupancy status messages from their respective occupancy sensors 412, 415, and 414 to the server 42 via the backhaul channel.

Based on such occupancy status messages, the server logic 111 determines that rooms 431, 433, and 434 are occupied by patients and that room 432 is not occupied by a patient. Based on such determinations, the server logic 111 defines a rounding list 430 (FIG. 4) for the caregiver wearing the tag 52. The server logic 111 is configured to transmit this list 430 to a communication device 402, which displays the list 430 to the caregiver. FIG. 11 depicts an exemplary list 430 that may be displayed to the caregiver for the instant example at the start of an hour for which the caregiver is to visit the patients in the rooms 431-434.

In this regard, the list 430 has an entry for each room 431-434, and for each room 431-434, the list 430 indicates the name of the patient in the room and whether a visit to the patient in such room is still needed in order to comply with an applicable nurse rounding policy. In the instant example, based on the occupancy status messages sent from the occupancy sensors 412-415, the server logic 111 determines that rooms 431, 433, and 434 are occupied. Thus, the list 430 is defined such that each of these rooms 431, 433, and 434 requires a visit by the caregiver during the current monitoring period. However, the server logic 111 determines that room 432 is unoccupied, and a visit by the caregiver to this room 432 is therefore not required. Thus, the list 430 is defined to indicate that room 432 does not require a visit during the current monitoring period so the caregiver is aware that he or she does not need to waste time visiting the room 432.

For illustrative purposes, assume that the caregiver enters the room 431 in order to visit the patient in that room 431. After entering the room 431, the caregiver's tag 52 eventually awakens and receives a room identifier from one of the anchors 21, 22, or 24 in the room 431 via the optical channel. For illustrative purposes, assume that the tag 52 receives a room identifier from the anchor 21. In one embodiment, this room identifier is the network address of the anchor 21. In response to reception of the room identifier, the tag 52 transmits a tag status message via the in-room channel. Such tag status message has a source address identifying the tag 52 and includes the room identifier received by the tag 52 from the anchor 21.

Assume that the tag status message is received by the anchors 23 and 24. In the instant example, based on the room identifier in the tag status message, the anchor 23 determines that it is not to respond to the tag status message. That is, the anchor 23 determines that it does not serve as a proxy for the anchor 21 from which the room identifier originated. The anchor 24, however, does serve as a proxy for this anchor 21. Thus, the anchor 24 is aware that the tag 52 is in the same room as anchor 24, and the anchor 24, therefore, should further process the tag status message. In this regard, the anchor 24 stores the tag status message for later reporting to the server 42, as will be described in more detail below.

The anchor 24 also checks the listening indicator of the tag status message to determine whether the tag 52 is listening for a reply. In the instant example, the tag 52 has received a new room identifier and, therefore, asserts the listening indicator to indicate that it is listening for a reply. Thus, the anchor 24 checks its tag alert list 502 to determine whether to alert the tag 52 in response to a rules violation for which the tag 52 should issue a warning to the caregiver. In the instant example, assume that the tag alert list 502 does not indicate that the tag 52 is to be alerted. In such case, the anchor 24 does not send a reply, and the tag 52 eventually transitions to a sleep state after expiration of a predefined time period.

As indicated above, the anchor 24 is configured to transmit upstream during upstream time slots 451 (FIG. 6) that have been allocated to it according to an applicable TDM algorithm. During one such upstream time slot 451, the anchor 24 is configured to transmit the tag status message via the backhaul channel to the server 42. Referring to FIG. 1, such message hops through anchors 22 and 23 and the network access device 33, which encapsulates the message in accordance with the protocol of the LAN 36 in order to transmit the message to the server 42. After transmitting the tag status message, the anchor 24 retains the tag status message in memory until it receives confirmation that the message has been received by the network access device 33.

In this regard, if the network access device 33 does not receive a message from the anchor 24 during the upstream time slot 451 that is allocated to the anchor, then the network access device 33 includes the network address or other identifier of the anchor 24 in the anchor miss field 472 (FIG. 7) of the next downstream multicast message 470 transmitted by the network access device 33. As described above, inclusion of the network address or other identifier of the anchor 24 in the field 472 indicates that the network access device 33 did not receive a message from the anchor 472 during such anchor's last upstream time slot 451. Thus, upon receiving the downstream multicast message 470, the anchor 24 is aware that the tag status message transmitted by the anchor 24 in its last upstream time slot 451 did not reach the network access device 33. In such case, the anchor 24 is configured to retransmit the tag status message in the next upstream time slot 451 allocated to the anchor 24. This process continues until the network access device 33 receives the tag status message at which point the network access device 33 does not include the network address of the anchor 24 in the next downstream multicast message 470 transmitted by the network access device 33. Upon receiving this message 470, the anchor 24 is aware that the tag status message has been successfully received by the network access device since its network address is not included in the field 472. In such case, the anchor 24 may discard or overwrite the tag status message that is stored at the anchor 24.

Upon receiving the tag status message, the server 42 is aware that the tag 52 has now entered the room 431. Based on the rules data 143, the rules engine 115 is configured to determine whether the detected event of the tag 52 entering the room 431 results in a rules violation. In this regard, the rules engine 115 consults the rules data 143 to determine whether there are any rules associated with the event of a tag entering the room 431. For illustrative purposes, assume that the rules data 143 (FIG. 4) indicates that a rules violation occurs 15 seconds after the tag 52 enters the room 431 unless a hand washing event occurs in the room 431. Based on such data 143, the rules engine 115 is configured to analyze the event data 144 (FIG. 4) in order to determine whether the dispenser node 316 reports a hand washing event in the room 431 within 15 seconds of the tag 52 entering the room 431.

Note that the server logic 111 updates the rounding list 430 (FIG. 4) in response to detection of the tag 52 entering the room 341. In this regard, as shown by FIG. 12, the server logic 111 updates the list 430 to indicate that a visit to the room 431 is no longer required for the current monitoring period in order to comply with the applicable nurse rounding policy. The server logic 111 communicates this update to the communication device 402, which displays the updated list 430 to the caregiver. Thus, by viewing the list 430, the caregiver should be aware that there is no need to visit the room 431 in the near future in order to comply with the applicable nurse rounding policy.

For illustrative purpose, assume that no hand washing event occurs within 15 seconds of the tag 52 entering the room 341 such that the rules engine 115 detects and logs a rules violation associated with the tag 52. In response, the rules engine 115 notifies the server logic 111 of the violation, and the server logic 111 transmits to each network access device 33 and 34 a tag alert message that includes the tag identifier of the tag 52 and an event indicator. In the next downstream multicast message 470 (FIG. 7) transmitted by the network access device 33, the network access device 33 includes such identifier/indicator pair in the tag alert field 473 so that the proxy anchors of the sub-network 28 are aware that a tag alert message is to be conveyed to the caregiver's tag 52. After transmitting the downstream multicast message 470, the network access device 33 retains the identifier/indicator pair in memory until it receives confirmation that such pair has been received by each proxy anchor of the sub-network.

In this regard, if a proxy anchor of the sub-network 28 does not receive the downstream multicast message 470, then such proxy anchor will refrain from transmitting upstream in the same frame 445 (FIG. 6) for which the downstream multicast message was missed. Further, when the network access device 33 does not receive an upstream transmission during an upstream time slot allocated for a particular proxy anchor, the network access device 33 assumes that this proxy anchor did not receive the downstream multicast message previously transmitted in the same frame 445. In such case, the network access device 33 retransmits the data to be received by such proxy anchor in the next downstream multicast message 470. This process continues until the network access device 33 receives from the proxy anchor an upstream transmission, which the network access device 33 uses as confirmation that the proxy anchor received the data transmitted to the proxy anchor in the last downstream multicast message. Using such techniques, the network access device 33 can ensure that each proxy anchor is informed of the tag alert message transmitted from the server 42. After such confirmation, the network access device 33 may discard or overwrite the identifier/indicator pair from the tag alert message.

Upon receiving a downstream multicast message having the identifier of the tag 52 in the tag alert field 473, each proxy anchor is configured to update its tag alert list 502 (FIG. 2) in order to include the tag's identifier and the associated event indicator in a valid entry of the list 502. Thus, each proxy anchor in the sub-network 28 is now ready to send a tag alert message to the tag 52 in the event that the tag 52 communicates with such proxy anchor via a tag status message, as will be described in more detail below.

After distribution of the tag alert message for the tag 52, the next time that the tag 52 awakens and communicates a tag status message, the proxy anchor receiving such tag status message may send a tag alert message to the tag 52 provided that the tag 52 is listening for a reply. For illustrative purposes, assume that the tag 52 is still in the room 431 after distribution of the tag alert message to the proxy anchors. In such case, the tag 52 eventually awakens, receives a room identifier from one of the anchors 21, 22, or 24 in the room 431, and transmits a tag status message via the in-room channel.

For illustrative purposes, assume that the tag status message is received by anchors 23 and 24. The anchor 23 determines that it is not to respond to the tag status message based on the room identifier in the tag status message. Thus, the anchor 23 does not attempt to transmit a tag alert message to the tag 52 even though the tag alert list 502 of the anchor 23 indicates that the tag 52 is to receive an alert. Note that, in other embodiment, other techniques may be used by an anchor to determine whether to transmit a tag alert message to the tag 52. For example, instead of transmitting such a tag alert message based on whether the anchor has received a corresponding room identifier from the tag 52. In such an example, an anchor may be configured to transmit a tag alert message if the tag status message received by the anchor exceeds a predefined threshold.

However, the anchor 24 determines that it is to process the tag status message based on the room identifier in such message. If the listening indicator of the tag status message is asserted, indicating that the tag 52 is listening for a reply, the anchor 24 would check its tag alert list 502 to determine whether to respond by transmitting a tag alert message to the tag 52. In the instant example, the tag 52 would be identified by a valid entry in the list 502, and the anchor 24, therefore, would transmit a tag alert message to the tag 52. In response to the tag alert message, the tag 52 would issue a warning to the caregiver. Such a situation would be ideal since the tag 52 is still in the room 431 making it easy for the caregiver to associate the warning with the correct rules violation (i.e., failure to wash his or her hands within a predefined time of entering the room 431).

For illustrative purposes, however, assume that the listening indicator of the tag status message transmitted to the anchor 24 is deasserted thereby indicating that the tag 52 is not listening. In such case, the anchor 24 makes no attempt to transmit a tag alert message since such message would be received by the tag 52 after transitioning to a sleep state.

Further assume that the next time the tag 52 awakens, the tag 52 is now located outside of the room 431 in the hallway between rooms 431 and 433. At such time, the tag 52 receives a room identifier identifying a new room (e.g., hallway) or other area that is serviced by a different proxy anchor 701 relative to the proxy anchor 24 that serviced the room 431. Thus, when the tag 52 transmits a tag status message, the tag 52 asserts the listening indicator and waits on a reply for a predefined amount of time since the tag 52 has now transitioned to a new room. In such case, the anchor 701 responds to the tag status message by transmitting a tag alert message, which includes the tag identifier of the tag 52 and the event indicator associated with the detected rules violation. Such message is received by the tag 52, which compares the event indicator to the alert event list 515 (FIG. 5) stored in the tag 52. In the instant example, this is the first time the tag 52 has received a tag alert message associated with the instant rules violation, and the list 515, therefore, should not include the event indicator from the tag alert message. In such case, the tag logic 205 of the tag 52 is configured to issue a warning by activating the vibrator 244 and the light source 245 and to add the event indicator to the alert event list 515. Note that after transmitting the tag alert message, the anchor 701 may invalidate the entry of its tag alert list 502 identifying the tag 52 so that the anchor 701 does not attempt to send a second tag alert message in the event that the anchor 701 receives another tag status message from the tag 52 in the future.

Accordingly, even though the caregiver does not receive a warning while in the room 431, the caregiver does receive a warning just after leaving the room 431. In such case, the caregiver is likely to associate the warning with the correct rules violation (i.e., a failure of the caregiver to promptly wash his or her hands while in the room 301).

After issuing a warning in the hallway, assume that the caregiver enters the room 433. In such case, the tag 52 will eventually awaken, receive a room identifier from an anchor in the room 433, and transmit a tag status message. Since the user is now in room 433 and the anchor 703 serves as a proxy for nodes within the room 433, the anchor 703 will respond to the tag status message. Further, since the tag 52 has received a room identifier identifying a new room, the listening indicator of the tag status message should be asserted indicating that the tag 52 is listening for a reply. In such case, the anchor 703 checks its tag alert list 502 and determines that a tag alert message is to be transmitted to the tag 52. Thus, the anchor 703 transmits a tag alert message including the identifier/indicator pair previously distributed by the server 42. However, at this point, the tag 52 has already issued a warning for this event indicator, which is now stored in the tag's alert event list 515 (FIG. 5). Thus, based on a comparison of the event indicator in the tag alert message and the alert event list 515, the tag 52 refrains from issuing a warning in response to such message, thereby preventing the tag 52 from issuing a second warning for the same rules violation.

Eventually enough time elapses such that the identifier/indicator pair expires. That is, each proxy anchor eventually invalidates the entry in its respective tag alert list 502 (FIG. 2) that is storing the identifier/indicator pair. At this point, the pair may be overwritten or otherwise discarded. After such expiration, assume that the tag moves to an area serviced by the anchor 705. At this point, when the anchor 705 receives a tag status message from the node 52, the anchor 705 makes no attempt to transmit a tag alert message to the tag 52 since the aforementioned identifier/indicator pair is no longer stored in a valid entry of the anchor's tag alert list 502.

Accordingly, when a rules violation occurs, the system 15 ensures that the tag 52 is promptly informed of the rules violation so that the tag 52 issues a warning to the caregiver wearing or otherwise carrying the tag 52. However, steps are taken to ensure that only one warning is actually issued in an effort to ensure that the caregiver is not confused as to the purpose of the warning. However, if desired, multiple warnings may be issued in other embodiments.

Note that when the tag 52 enters the room 433, a tag status message is transmitted from the tag 52 to the anchor 703 via the in-room channel, as described above. Such tag status message is then transmitted via the backhaul channel from the anchor 703 to the server 42. In response, the server logic 111 updates the rounding list 430 to indicate that it is no longer necessary for the tag's caregiver to visit the patient that is in the room 303 during the current monitoring period, as shown by FIG. 13. However, for illustrative purposes, assume that the caregiver fails to enter the room 434 before expiration of the current monitoring period.

When the monitoring period expires, the rules engine 115 is configured to analyze the rounding list 430 to determine whether there remains any rooms that need to be visited to comply with the applicable nurse rounding policy. In the instant example, the caregiver has not entered room 434, which is determined to be occupied by a patient. Thus, at expiration of the monitoring period, the list 430 should indicate that room 434 needs to be visited by the caregiver. In such an example, the rules engine 115 is configured to detect and log a rules violation. The server logic 111 is further configured to initialize the rounding list 430 for the next monitoring period (e.g., the next hour). Thus, if the patient of room 432 has returned to the room 432 and patients remain in rooms 431, 433, and 434, then the server logic 111 is configured to initialize the list 430 to indicate that each of the rooms 431-434 needs to be visited in order to comply with the applicable nurse rounding policy.

In addition, at expiration of the monitoring period or some predefined time (e.g., 5 minutes) before expiration, the rules engine 115 may be configured to determine whether there remain any rooms to be visited in order to comply with the applicable nurse rounding policy. If there are any such rooms, the rules engine 115 is configured to inform the server logic 111, which in response transmits a tag alert message in order to warn the caregiver of the rules violation or the impending rules violation. Such tag alert message is communicated to the tag 52 according to the techniques described above, and the tag 52 therefore issues a warning to the caregiver.

Various examples are provided herein in an effort to convey a clear understanding of the subject matter described in this application. Various changes or modifications to the described examples would be apparent to a person of ordinary skill upon reading this disclosure.

As an example, if patients wear or otherwise carry tags 52, then it is possible to make rounding decisions based on the proximity of the caregiver's tag 52 relative to the patient's tag 52 without necessarily determining whether the caregiver's tag 52 has entered the patient's room. Thus, if the caregiver comes within a close distance of the patient, whether in the patient's room or not, the server logic 111 may be configured to determine that the caregiver has visited the patient for the current monitoring period.

In addition, in several embodiments described above, anchors are described as serving as proxies for other nodes within the same room. It is unnecessary for proxy groupings to be based on room assignments. As an example, a given node may serve as a proxy for other nodes even if they are in different rooms. To help reduce network traffic, it is generally desirable (but not necessary) for a proxy node to be in direct communication with the nodes for which it is serving as a proxy.

Also, several embodiments are described above in the context of tracking assets at a healthcare facility, including monitoring for compliance with applicable hand washing policies. It should be emphasized that the asset tracking systems and techniques described herein may be used to track assets in other contexts and applications, including applications outside of the healthcare industry.

It should also be emphasized that any asset can be tracked and monitored by the system 15 according to the techniques described herein. As an example, a tag 52 may be coupled to equipment and communicate with the server 42, as described above, so that the server 42 can determine the location of the equipment and monitor the equipment as it is moved. For example, in a healthcare context, the equipment may include a hospital bed, an intravenous (IV) machine, or other type of equipment used and monitored at a healthcare facility. Such monitoring may be useful for determining the location of misplaced equipment. As a mere example, when a user is searching for particular equipment, the user may submit a request, via communication device 402 or otherwise, that includes an identifier that uniquely identifies the equipment being sought. In response, the sever logic 111 may be configured to determine the equipment's location based on the tag data 142 and transmit to the communication device 402 a message indicative of such location. Thus, when the communication device 402 displays or otherwise renders the message, the user is informed of the approximate location of the equipment helping the user to find such equipment.

In another example, the server logic 111 is configured to determine when a rules violation is imminent or has occurred based on the location of the equipment being monitored and to then transmit a notification warning of the rules violation. For illustrative purposes, assume that it is the policy at a healthcare facility for equipment to be washed between patients. In this regard, when a set of equipment, such as an IV machine, is used to treat a patient, assume that the equipment is to be washed before being used to treat another patient. For example, the equipment may be taken to a particular location, such as a washing station, for cleansing.

In such an example, the tag 52 that is used to monitor the equipment preferably communicates with the server 42 so that the server logic 111 can determine when the equipment is being used to treat a patient. As an example, the rules engine 115 may compare the location of the equipment to locations of patients to determine when the equipment is being used to treat a patient. In this regard, if the distance between the equipment and a given patient falls below a specified threshold for at least a specified amount of time, the rules engine 115 may be configured to determine that the equipment is being used to treat the patient. In such case, the rules engine 115 expects a washing event to be sensed for the same set of equipment before it is used to treat another patient.

In this regard, when the equipment is taken to a washing station for washing, the rules engine 115 may determine that a washing event occurs when the location of the tag 52 indicates that the distance between the tag 52 and the washing station is less than threshold. Further, techniques similar to those described above for determining when a healthcare provider is approaching a patient or a specific area in which a patient is located, such as an area for the patient's bed, without washing his or her hands may be used to determine when the equipment is approaching a patient or a specific area without being washed. In this regard, if the equipment is deemed to be within a certain distance of a patient or a certain area in which the patient is expected, the rules engine 115 checks the event data 144 to determine whether a washing event for the equipment occurred since the last time the equipment was used to treat another patient. If no such washing event is indicated by the event data 144, the rules engine 115 is configured to detect a rules violation or warning event once the equipment's location, as indicated by its tag 52, reaches a certain location (e.g., a certain distance from a patient or a location in which the patient is expected).

Thus, as described above for hand washing violations, a tag alert message may be transmitted by the server 42 after a violation occurs or when a violation is imminent to warn a user of the violation or the expected violation. In one embodiment, the tag alert message is transmitted to the tag 52, which renders a warning (such as emitting a sound and/or displaying a visual cue). In yet other embodiments, yet other types of assets may be tracked and monitored by the system 15, as may be desired.

The invention claimed is:

1. An asset tracking system, comprising:
   a network access device;
   a server;
   a plurality of anchors configured to communicate with the server through the network access device, the plurality of anchors including at least a first anchor and a second anchor, wherein the network access device and the plurality of anchors are configured to communicate via a backhaul channel divided into frames, each of the frames having at least one downstream time slot for communicating at least one downstream multicast message from the network access device and at least one upstream time slot for each of the plurality of anchors to transmit at least one upstream multicast message to the network access device; and
   a tag configured to communicate with the plurality of anchors as the tag is moved by a user being tracked by the system, the tag configured to transmit a data to at least the first anchor,
   wherein the first anchor is configured to transmit an upstream multicast message having the data via the backhaul channel, wherein the first anchor is configured to determine whether to retransmit the data based on a downstream multicast message received by the first anchor from the network access device via the backhaul channel, wherein the downstream multicast message received by the first anchor has a field indicating whether the network access device received a respective upstream multicast message from each of the plurality of anchors during one of the frames, wherein the network access device is configured to receive the data from the first anchor and to transmit the data to the server, wherein the server is configured to receive the data from the network access device and to determine a location of the tag based on the data, the server further configured to detect an occurrence of an event based on the location and to transmit a tag alert message to the network access device in response to the occurrence of the event, wherein the network access device is configured to transmit, in response to the tag alert message, the tag identifier to each of the plurality of anchors in a downstream multicast message via the backhaul channel, and wherein at least one of the plurality of anchors is configured to communicate with the tag in response to the tag identifier for causing the tag to issue a warning.

2. The asset tracking system of claim 1, wherein the data is based on communication between the tag and at least one of the plurality of anchors.

3. The asset tracking system of claim 1, wherein the tag is configured to transmit the data to the first anchor via a wireless electrical channel having a frequency range different than a frequency range for the backhaul channel.

4. The asset tracking system of claim 1, wherein the tag alert message has an event indicator associated with the occurrence of the event.

5. The asset tracking system of claim 1, wherein at least one of the plurality of anchors has a sensor, and wherein the first anchor is configured to transmit sensor data from the sensor in the upstream multicast message that includes the data.

6. The asset tracking system of claim 5, wherein the first anchor has the sensor.

7. The asset tracking system of claim 5, wherein the second anchor has the sensor.

8. The asset tracking system of claim 1, wherein at least one of the plurality of anchors has a pressure sensor for sensing atmospheric pressure.

9. The asset tracking system of claim 8, wherein the server is configured to determine the location based on the sensed atmospheric pressure.

10. The asset tracking system of claim 9, wherein the server is configured to identify a floor of a building based on the sensed atmospheric pressure.

11. The asset tracking system of claim 9, wherein the server is configured to identify a room of a building based on the sensed atmospheric pressure.

12. An asset tracking method, comprising:
   communicating between a server and a plurality of anchors through a network access device, the plurality of anchors including at least a first anchor and a second anchor, wherein the communicating between the server and the plurality of anchors comprises communicating between the network access device and the plurality of anchors via a backhaul channel divided into frames, each of the frames having at least one downstream time slot for communicating at least one downstream multicast message from the network access device and at least one upstream time slot for each of the plurality of anchors to transmit at least one upstream multicast message to the network access device;
   communicating between a tag and the plurality of anchors as the tag is moved by a user, wherein the communicating between the tag and the plurality of anchors includes transmitting data from the tag to at least the first anchor;
   transmitting an upstream multicast message having the data via the backhaul channel from the first anchor to the network access device;
   determining at the first anchor whether to retransmit the data based on a downstream multicast message received by the first anchor from the network access device via the backhaul channel, wherein the downstream multicast message received by the first anchor has a field indicating whether the network access device received a respective upstream multicast message from each of the plurality of anchors during one of the frames;

transmitting the data from the network access device to the server;

determining a location of the tag based on the data at the server;

detecting an occurrence of an event at the server based on the determined location;

transmitting a tag alert message from the server in response to the detecting, the tag alert message having a tag identifier identifying the tag;

transmitting the tag identifier from the network access device to each of the plurality of anchors in a downstream multicast message via the backhaul channel in response to the tag alert message; and communicating with the tag via at least one of the plurality of anchors to cause the tag to issue a warning in response to the transmitting the tag identifier from the network access device.

13. The method of claim 12, wherein the data is based on the communicating between the tag and the plurality of anchors.

14. The method of claim 12, wherein the transmitting the data from the tag comprises transmitting the data from the tag via an electrical channel having a frequency range different than a frequency range for the backhaul channel.

15. The method of claim 12, further comprising sensing atmospheric pressure with a pressure sensor, wherein the determining the location is based on the sensing.

16. The method of claim 15, wherein the determining the location comprises identifying a floor of a building based on the sensing.

17. The method of claim 15, wherein the determining the location comprises identifying a room of a building based on the sensing.

* * * * *